US007995361B2

(12) United States Patent
Park

(10) Patent No.: US 7,995,361 B2
(45) Date of Patent: Aug. 9, 2011

(54) CIRCUIT FOR OUTPUT VOLTAGE ERROR DETECT AND FEEDBACK IN SMPS

(76) Inventor: Chan Woong Park, Seoul (KR)

( * ) Notice: Subject to any disclaimer, the term of this patent is extended or adjusted under 35 U.S.C. 154(b) by 233 days.

(21) Appl. No.: 12/513,149

(22) PCT Filed: Oct. 22, 2007

(86) PCT No.: PCT/KR2007/005164

§ 371 (c)(1), (2), (4) Date: Apr. 30, 2009

(87) PCT Pub. No.: WO2008/054082

PCT Pub. Date: May 8, 2008

(65) Prior Publication Data

US 2009/0268487 A1 Oct. 29, 2009

(30) Foreign Application Priority Data

Nov. 1, 2006 (KR) ........................ 10-2006-0107260
Feb. 23, 2007 (KR) ........................ 10-2007-0018333

(51) Int. Cl.
*H02M 3/335* (2006.01)

(52) U.S. Cl. ................................. 363/21.12; 363/21.16

(58) Field of Classification Search ..... 363/21.12–21.18
See application file for complete search history.

(56) References Cited

U.S. PATENT DOCUMENTS 5,818,703 A 10/1998 Jacobson
6,385,061 B1 5/2002 Turchi et al.
6,728,117 B2 4/2004 Schemmann et al.
6,836,415 B1 * 12/2004 Yang et al. ................ 363/21.01
6,894,911 B2 * 5/2005 Telefus et al. .................. 363/97
7,336,508 B2 * 2/2008 Nakamura ................ 363/21.15
7,522,431 B2 * 4/2009 Huynh et al. ............. 363/21.12
2010/0110734 A1 * 5/2010 Park .......................... 363/21.16

FOREIGN PATENT DOCUMENTS

KR 10-2006-0100041 A 9/2006

OTHER PUBLICATIONS

International Search Report for International Application No. PCT/KR2007/005164.

* cited by examiner

*Primary Examiner* — Jessica Han
(74) *Attorney, Agent, or Firm* — Caesar, Rivise, Bernstein, Cohen & Pokotilow, Ltd.

(57) ABSTRACT

The present invention relates to an error information detection circuit and an error feedback circuit, which detect the error of an output voltage from a voltage induced to a winding. The circuit for detecting error information of an output voltage of a transformer from voltage induced to the feedback winding of the transformer and feeding back the error information includes a flyback period detection circuit (34) for detecting a flyback period from a voltage induced to the feedback winding. A comparison unit (35) compares the induced voltage of the feedback winding with a reference voltage and outputs a result of comparison. A logic unit (36) outputs error information of an output voltage of the transformer according to a flyback period detection output of the flyback period detection circuit and the output of the comparison unit. An up/down control unit (32) outputs a feedback value corresponding to the error information.

33 Claims, 15 Drawing Sheets

[Fig. 1] PRIOR ART
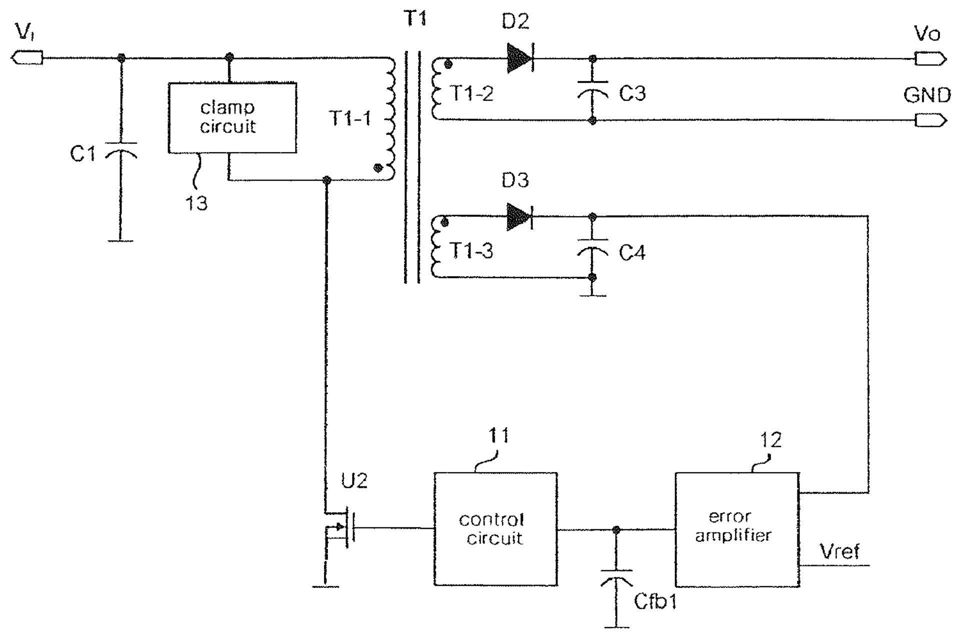
[Fig. 2] PRIOR ART
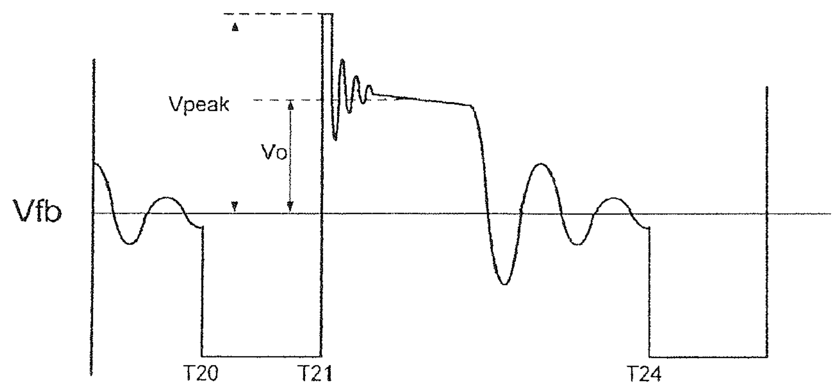
(a)
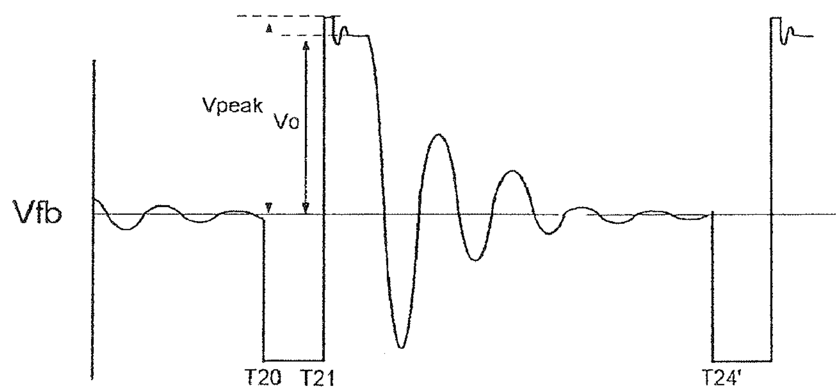
(b)

[Fig. 3]
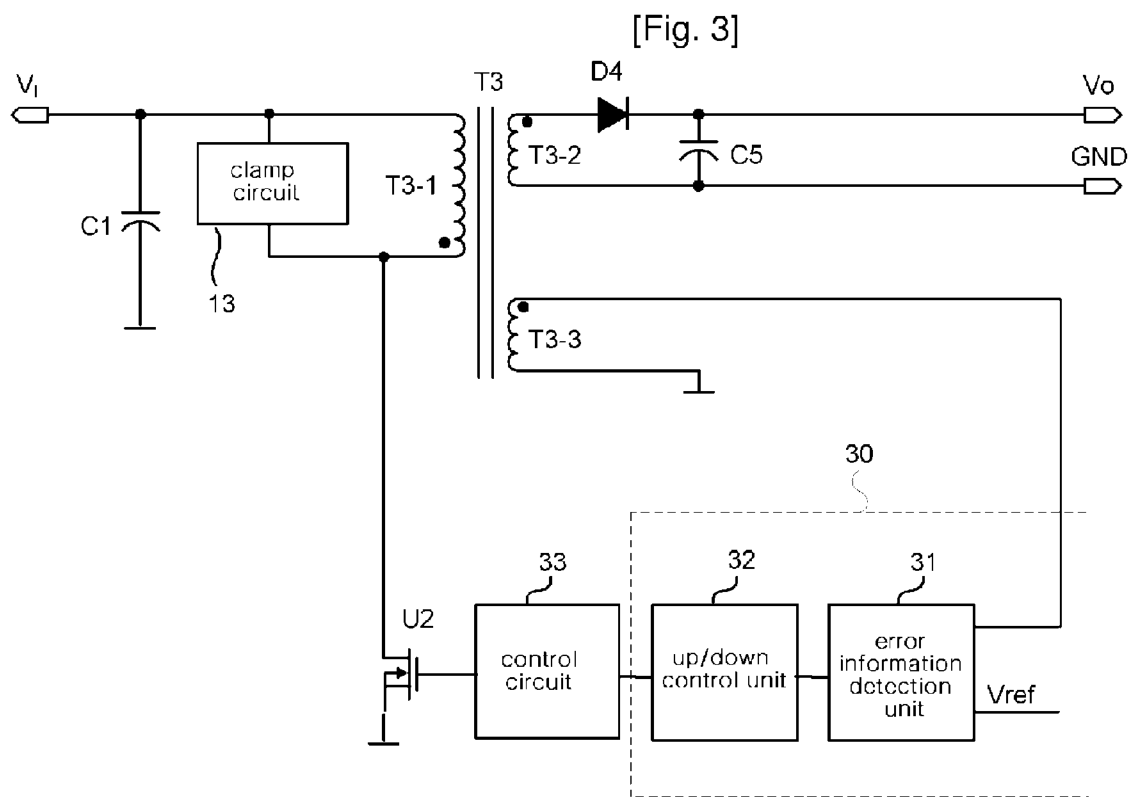
[Fig. 4]
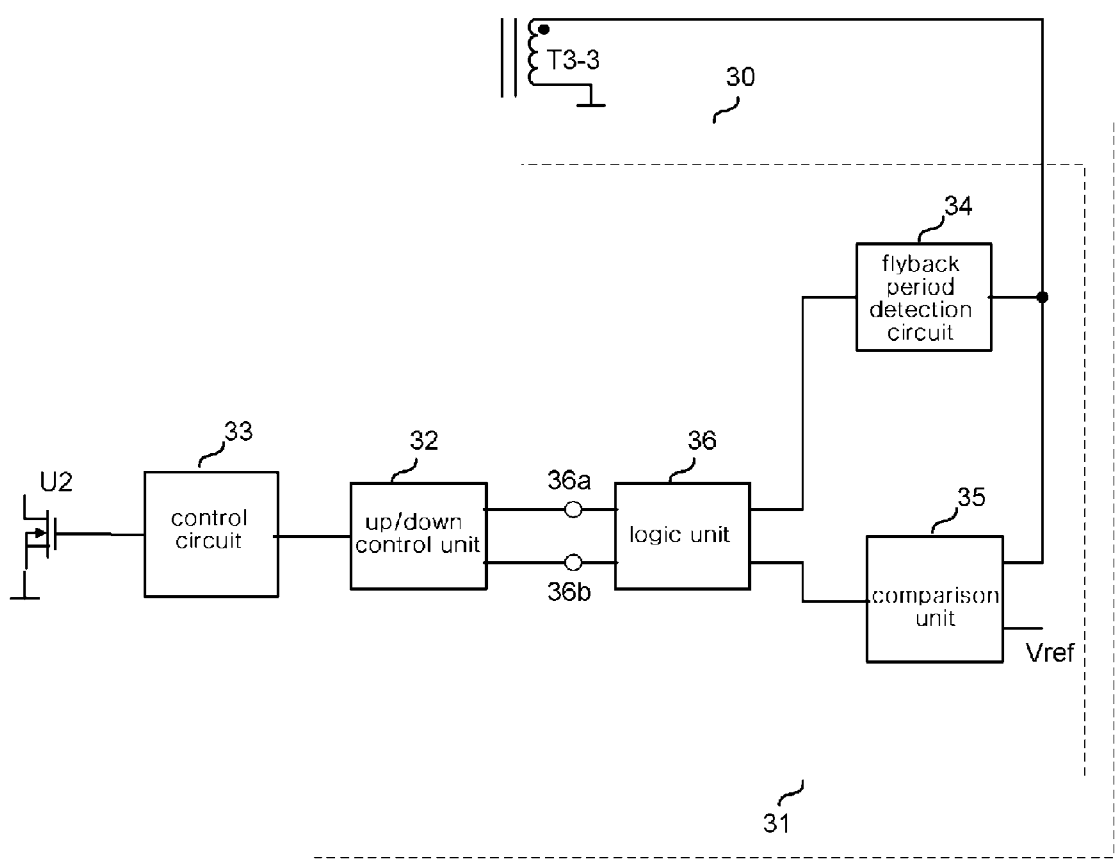

[Fig. 5]
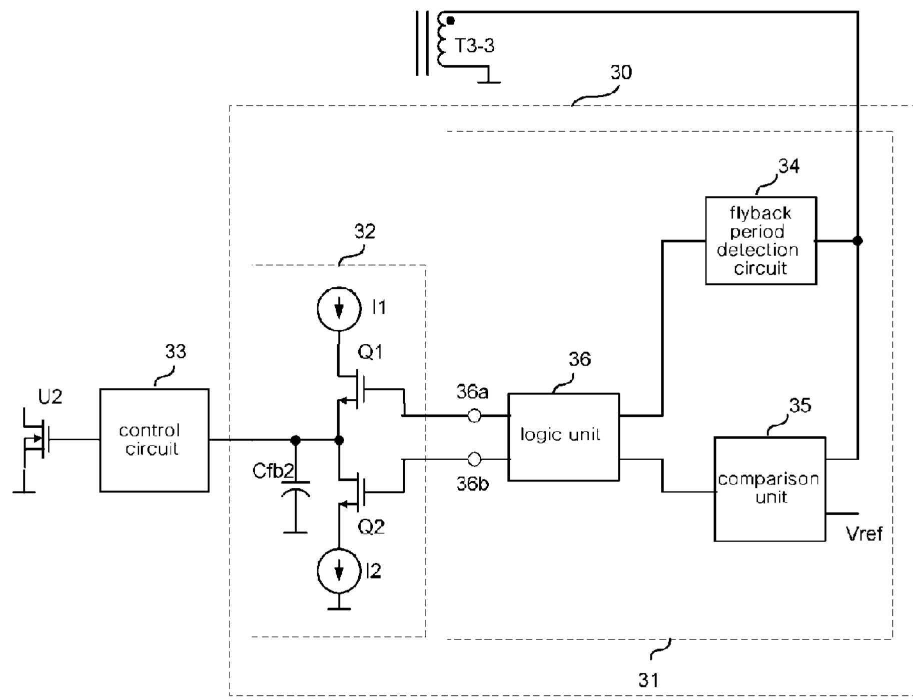
[Fig. 6]
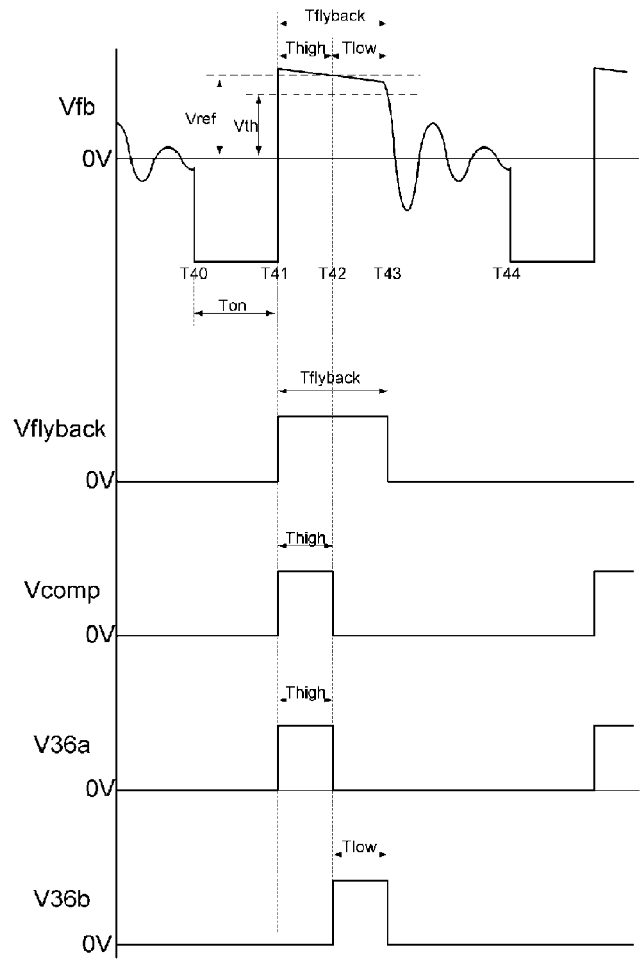

[Fig. 7]
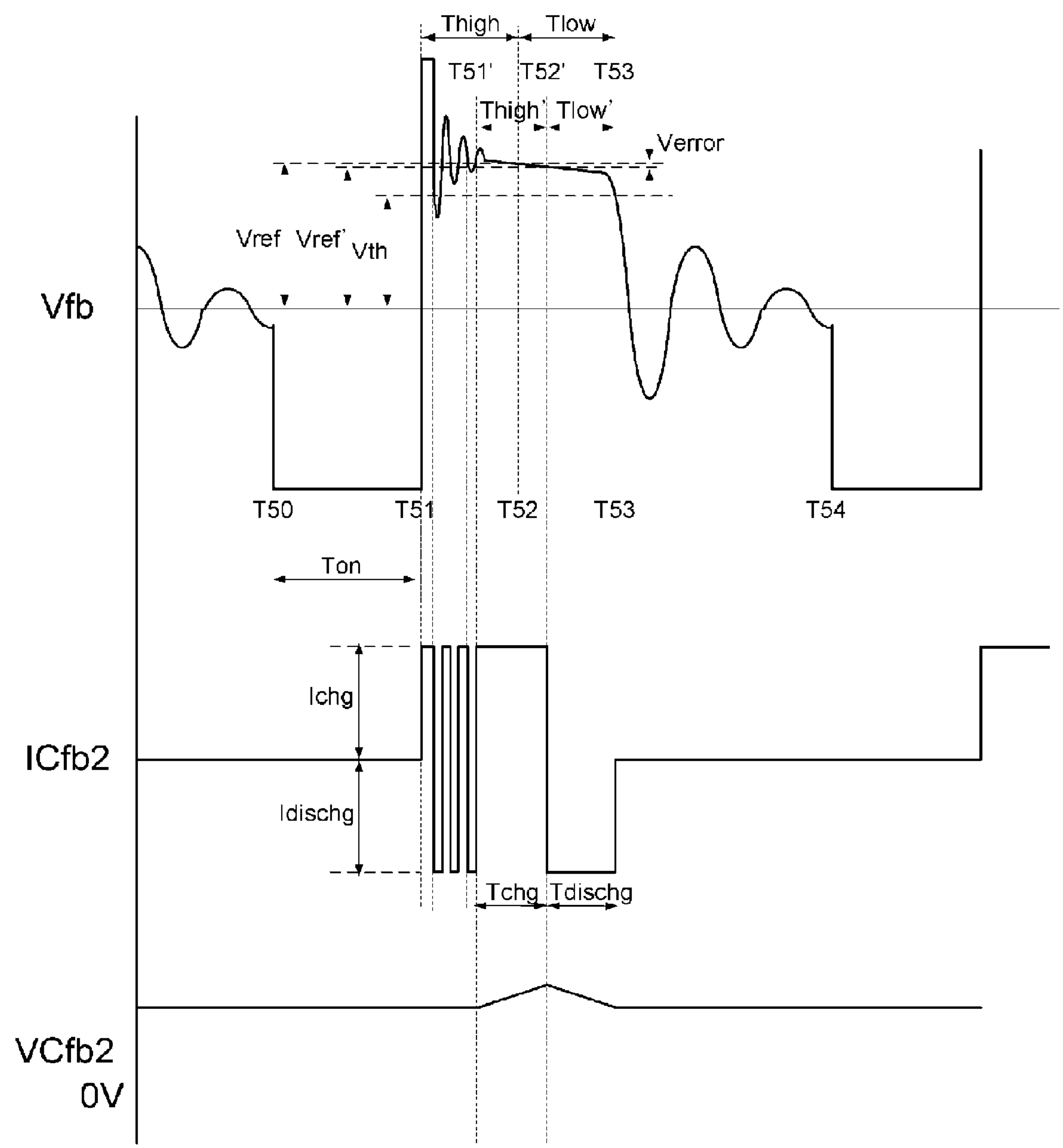

[Fig. 8]
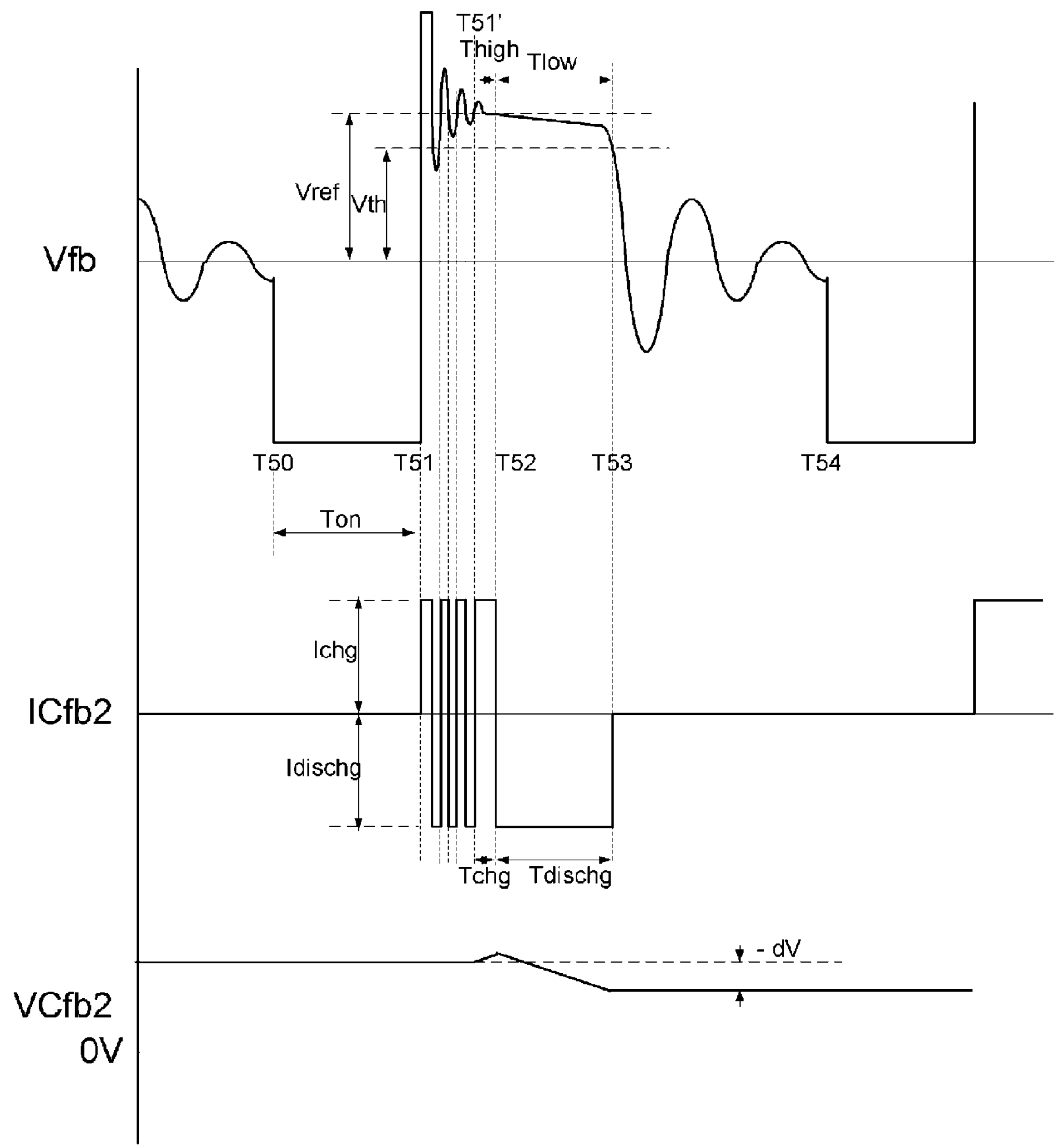

[Fig. 9]
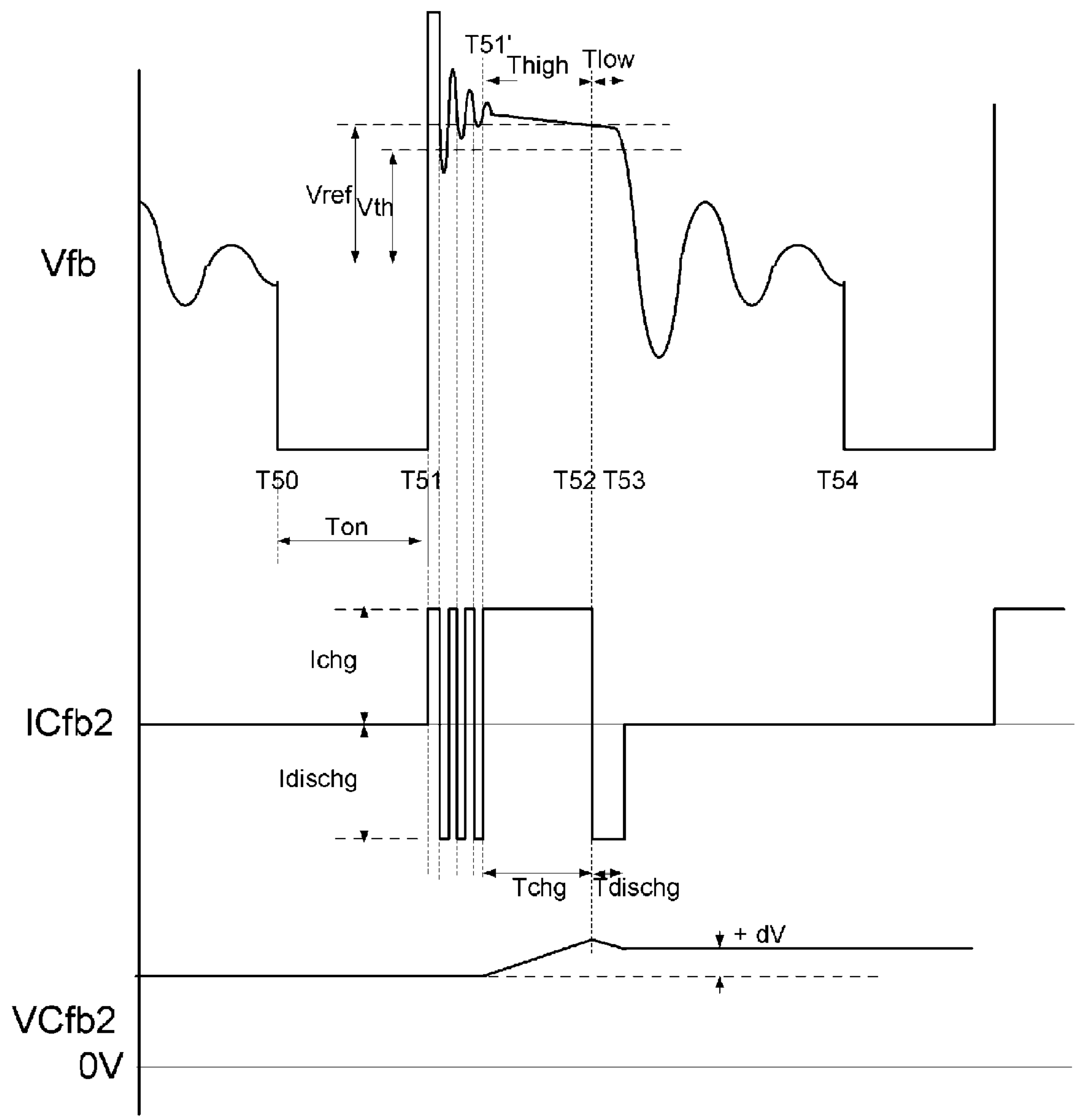

[Fig. 10]
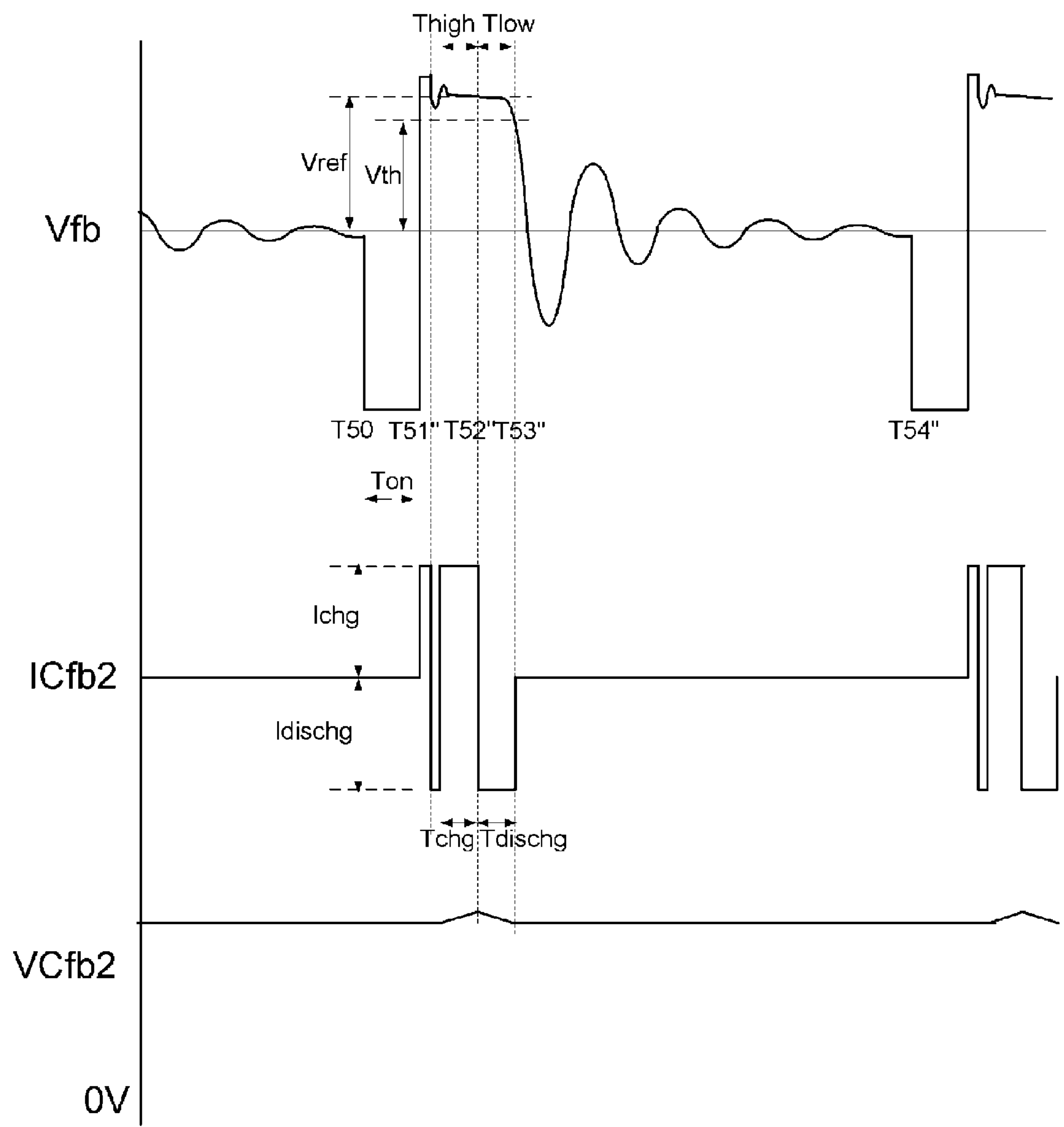

[Fig. 11]
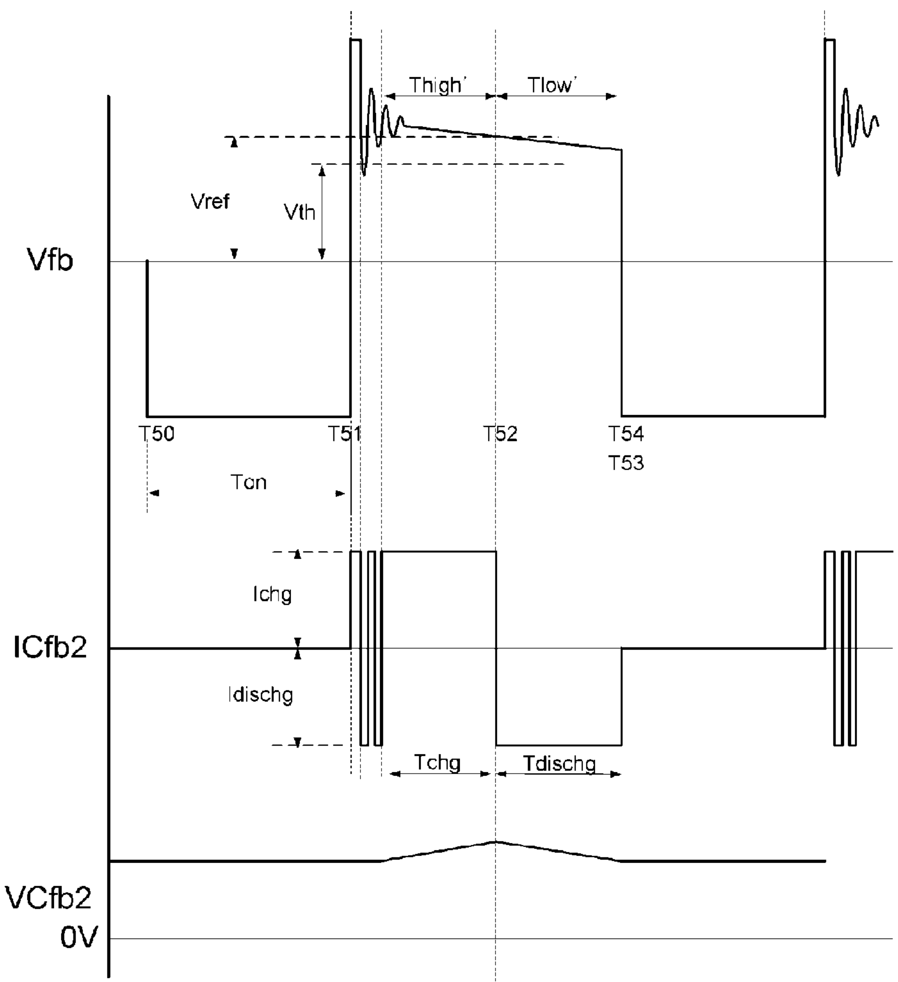
[Fig. 12]
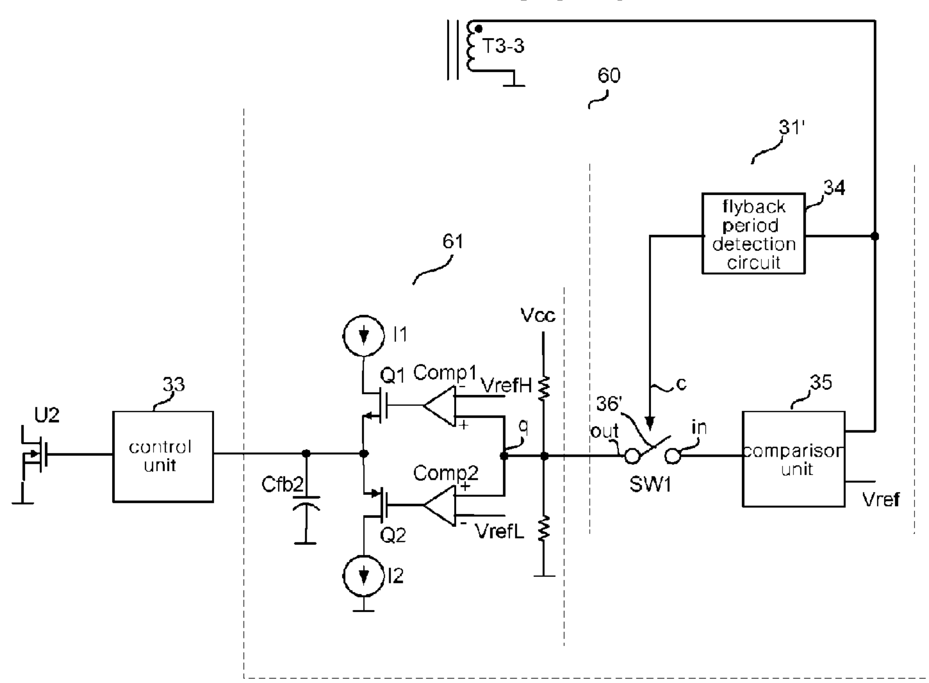

[Fig. 13]
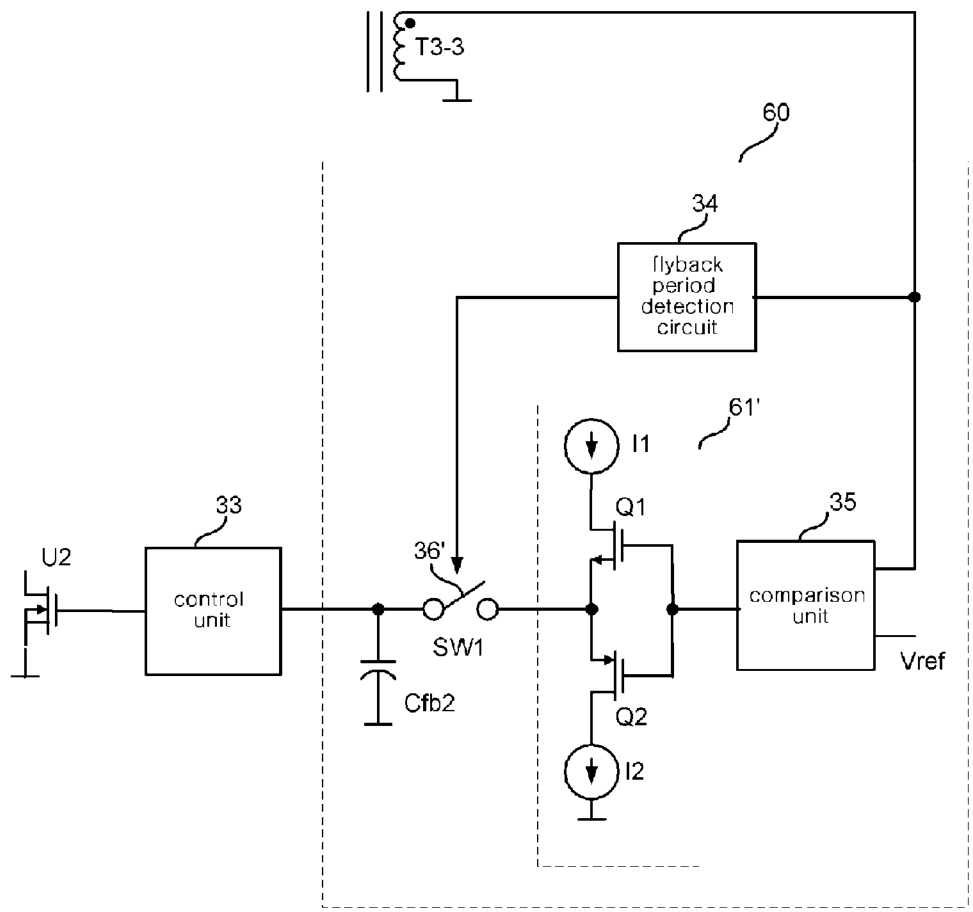
[Fig. 14]
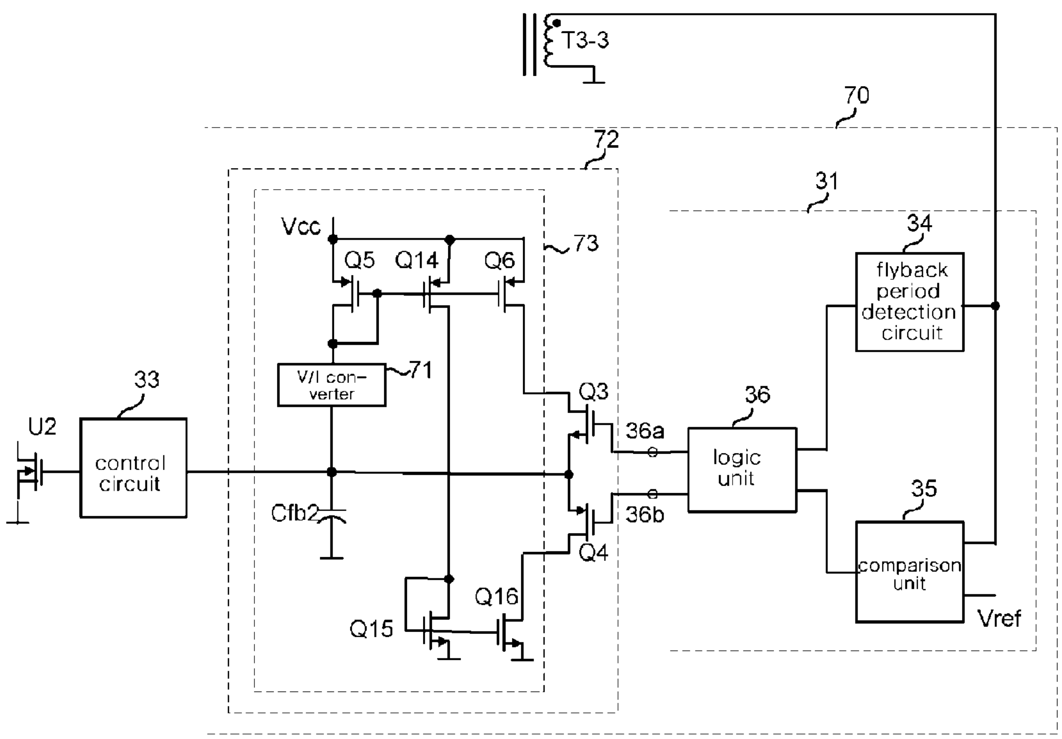

[Fig. 15]
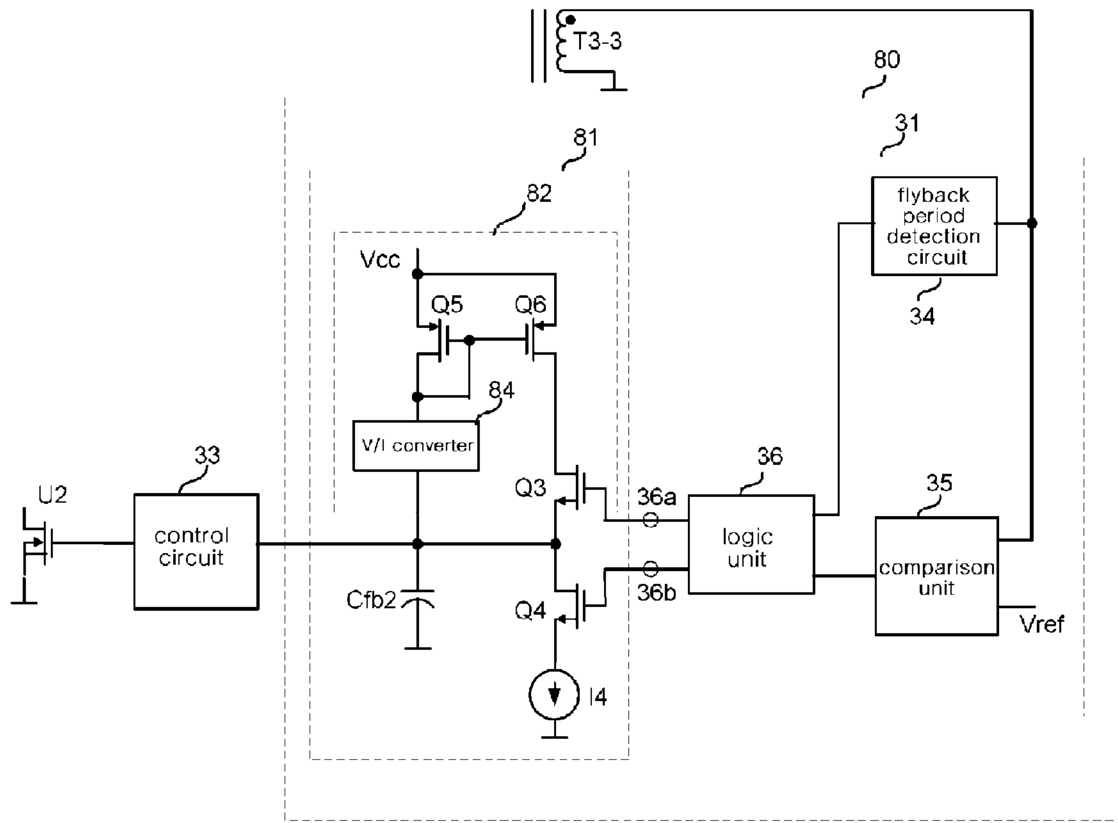
[Fig. 16]
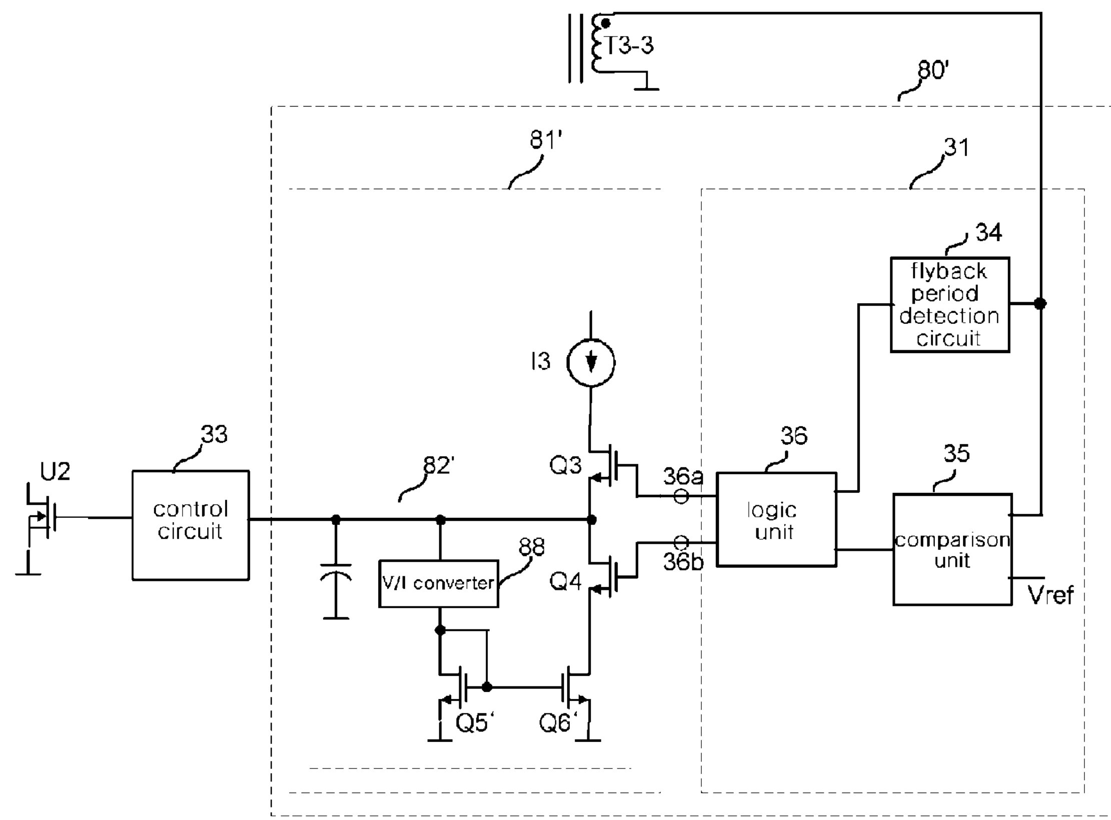

[Fig. 17]
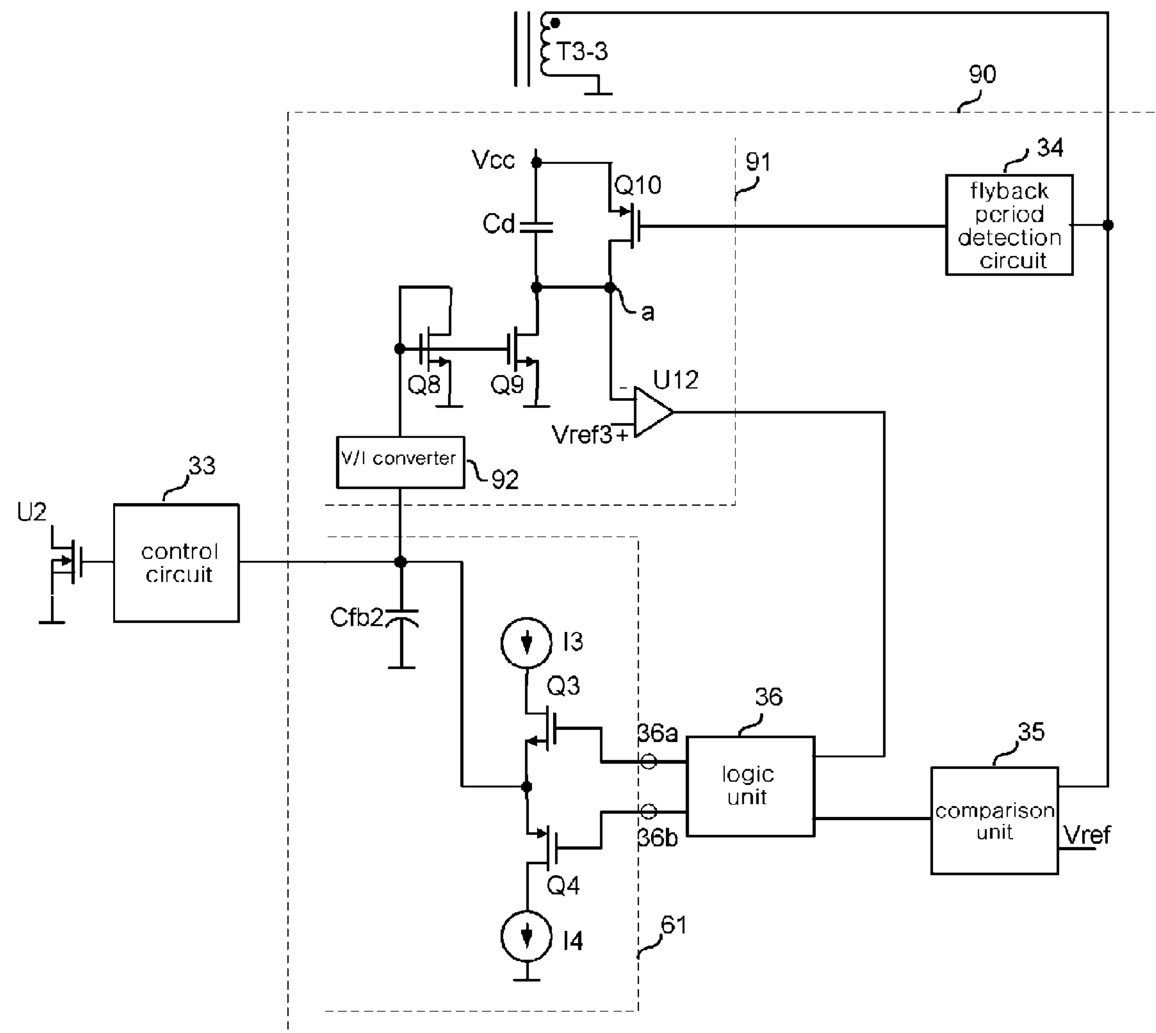

[Fig. 18]
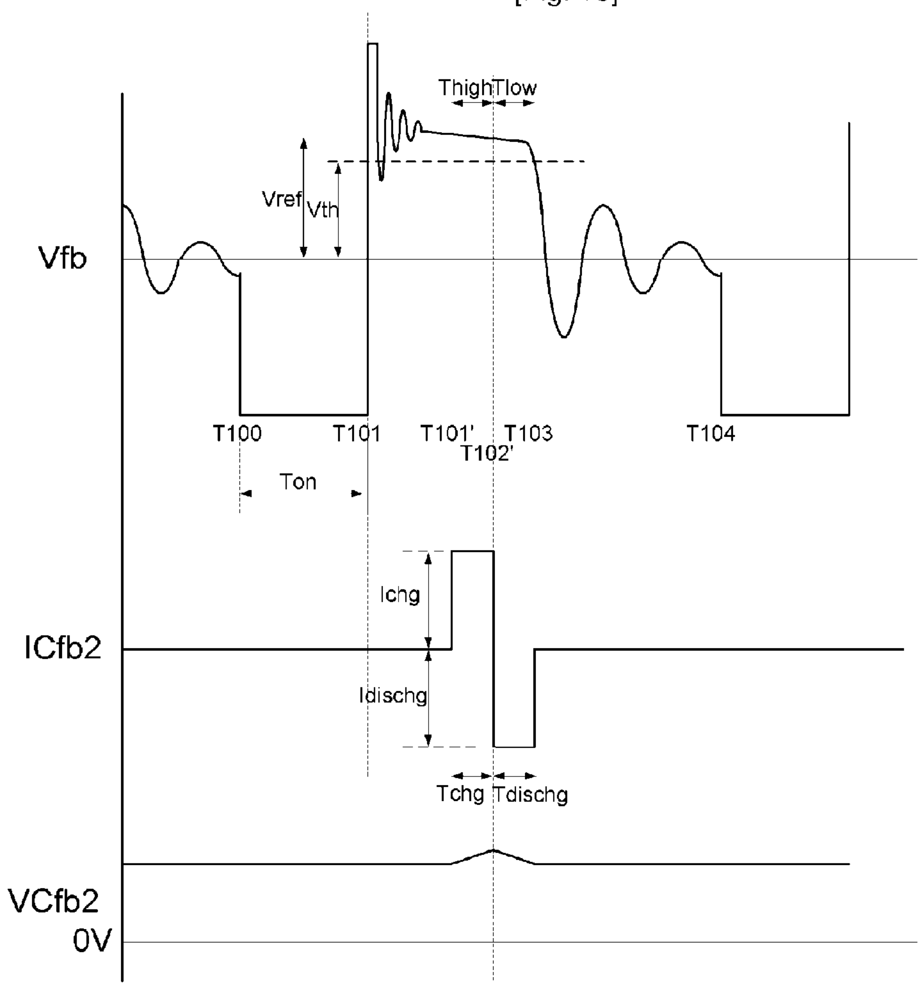
[Fig. 19]
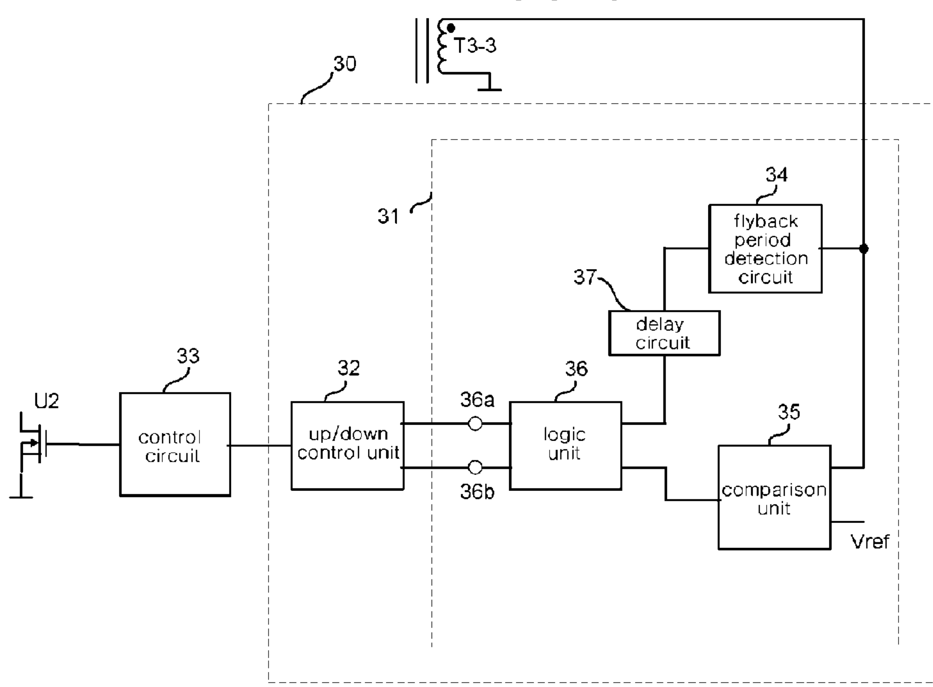

[Fig. 20]
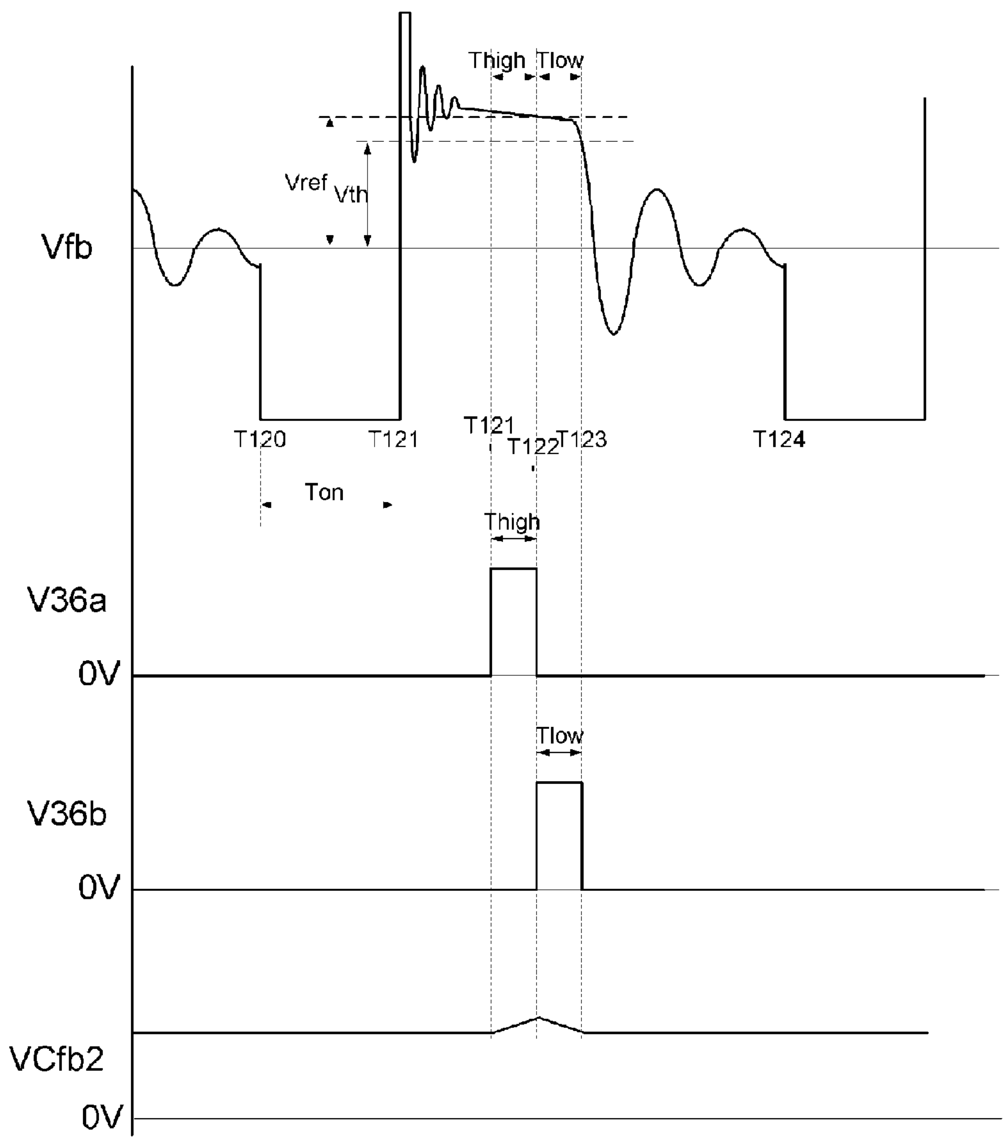
[Fig. 21]
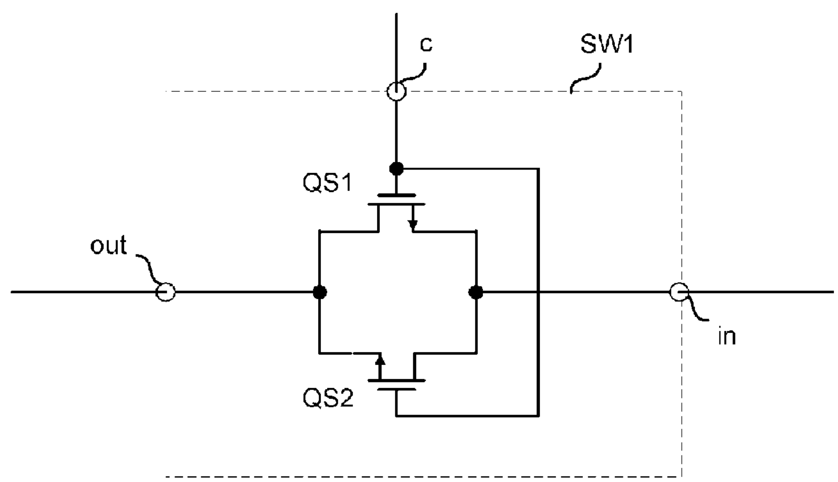

[Fig. 22]
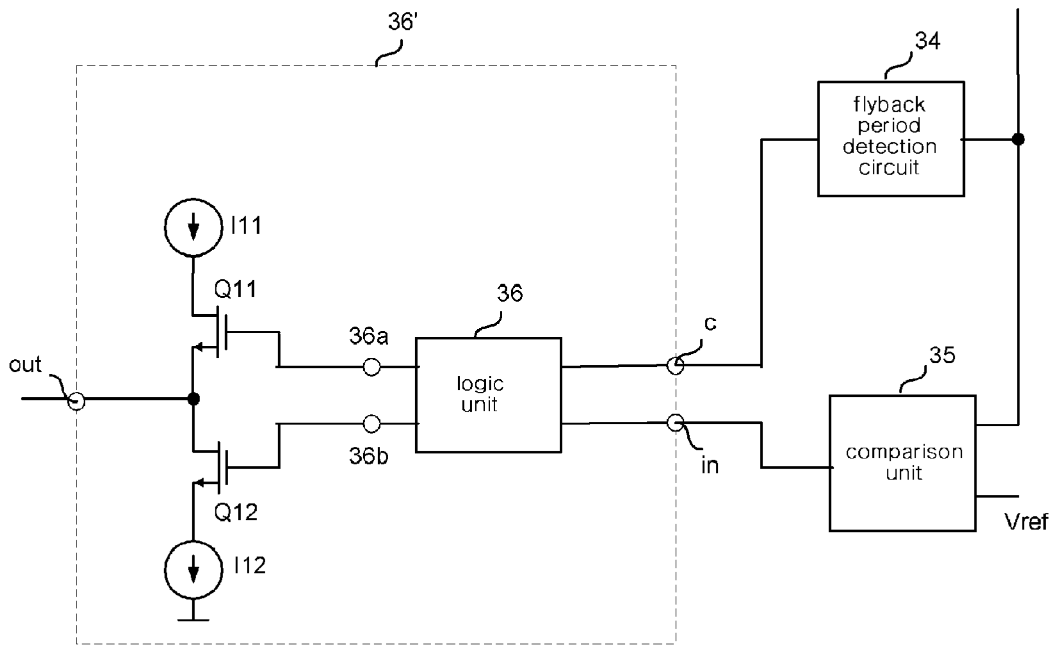
[Fig. 23]
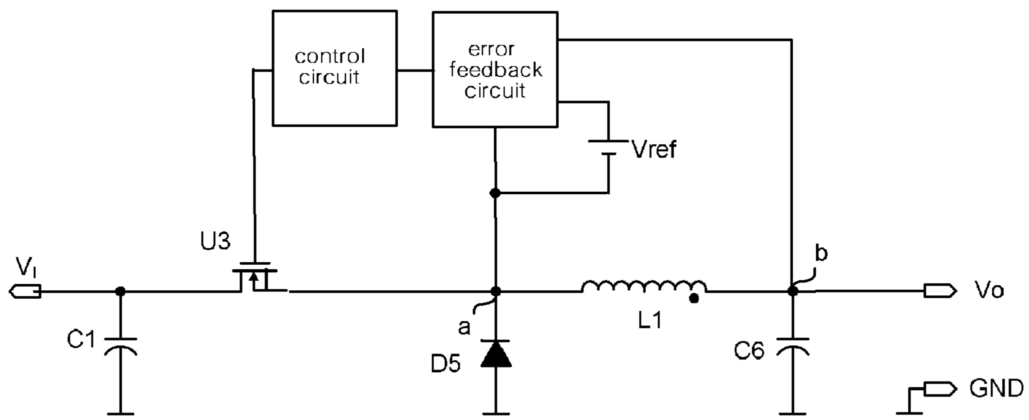
[Fig. 24]
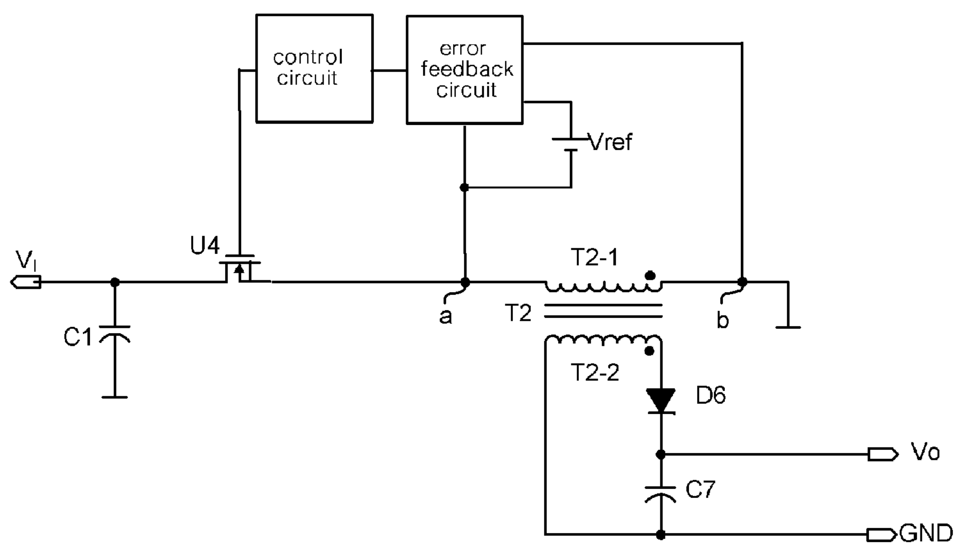

[Fig. 25]
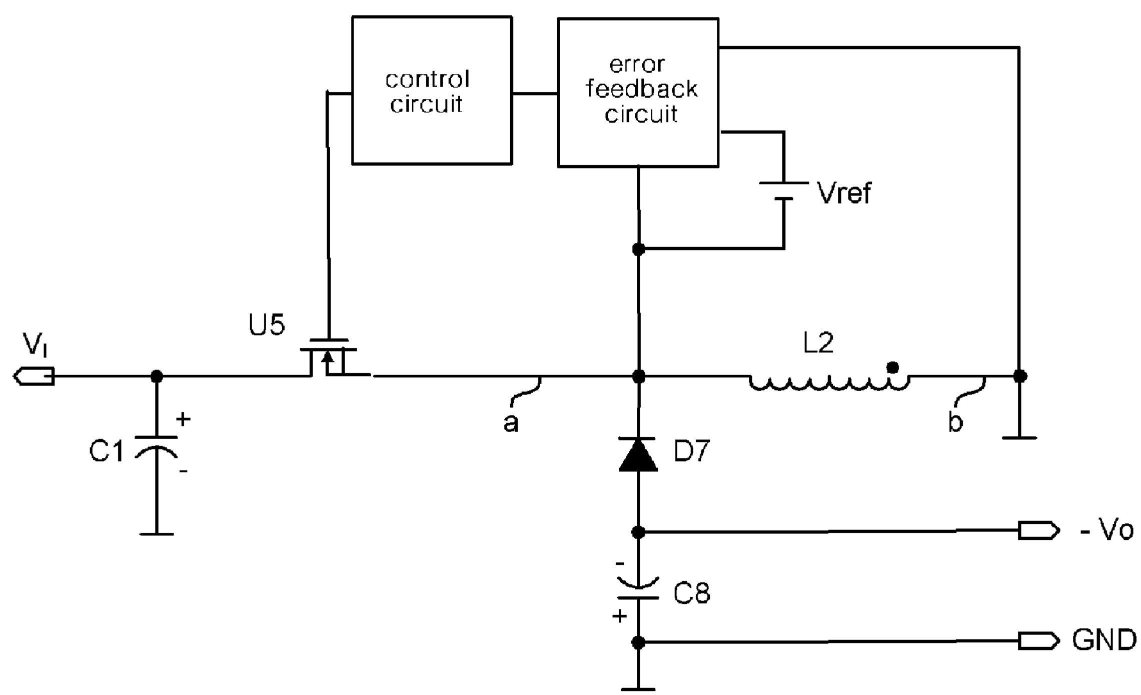

CIRCUIT FOR OUTPUT VOLTAGE ERROR DETECT AND FEEDBACK IN SMPS

CROSS-REFERENCE TO RELATED APPLICATIONS

This national stage application claims the benefit under 35 U.S.C. §371 of International Application No. PCT/KR2007/005164 filed on Oct. 22, 2007, entitled CIRCUIT FOR OUTPUT VOLTAGE ERROR DETECT AND FEEDBACK IN SMPS, which in turn takes its priority from Korean Application No. 10-2006-0107260 filed on Nov. 1, 2006 and from Korean Application No. 10-2007-0018333 filed on Feb. 23, 2007, and all of whose entire disclosures are incorporated by reference herein.

BACKGROUND OF THE INVENTION

1. Field of Invention

The present invention relates, in general, to a circuit for precisely detecting the error information of an output voltage from the winding voltage of a transformer, including a ringing voltage attributable to leakage inductance, in a Switching Mode Power Supply (SMPS), and a circuit and method for feeding the error information of the output voltage back to a control circuit, and, more particularly, to an SMPS, which can be implemented based on precise primary regulation using the invention. Further, the present invention also relates to a flyback converter, a buck-boost converter, and a buck converter, each including the error feedback circuit and method for the SMPS.

2. Description of Related Art

Generally, a Switching Mode Power Supply (SMPS) regulates an output voltage using a secondary regulation method. Such a secondary regulation method is implemented such that a typical error detection circuit is provided on an output voltage drawing part to precisely detect an output voltage, and such that detected error information is fed back to a power conversion unit through a photocoupler or the like, thus enabling the output voltage to be regulated. Since the secondary regulation method having such a structure is well known to those skilled in the art, a detailed description thereof is omitted.

An output voltage regulation circuit based on the above-described secondary regulation has high voltage stability, but increases the costs of a power circuit because expensive parts are used and the structure of the circuits is complicated.

Accordingly, when highly stable output voltage is not required, there are many factors to consider in order to reduce the costs of power circuits.

FIG. 1 illustrates a primary regulation-based power circuit generally proposed as an inexpensive power circuit.

This circuit detects voltage induced to an auxiliary winding T1-3, rather than the secondary side of a transformer T1, and feeds the detected voltage back to a control circuit, thus ultimately regulating an output voltage, which is output through a secondary winding T1-2. This method is called a primary regulation method.

The operation of the power circuit of FIG. 1 is described.

During the conduction period of a switching element U2, magnetic energy is stored in the primary winding T1-1 of the transformer T1, and during the non-conduction period of the switching element U2, the magnetic energy stored in the primary winding T1-1 is transferred to the secondary winding T1-2, closely coupled thereto, is rectified by a diode D2, is accumulated in a condenser C3, and is then supplied to a load (not shown).

Meanwhile, the primary winding T1-1 of the transformer T1 is wound to be closely coupled to the secondary winding T1-2, but, in practice, leakage inductance, which is not coupled to the secondary winding T1-2, exists. The energy stored in the leakage inductance is not transferred to the secondary winding T1-2, and extinguishes itself while undergoing resonance together with stray capacitance that exists in the primary winding T1-1. A clamp circuit 13 is typically used to suppress the magnitude of a surge spike voltage attributable to leakage inductance.

Therefore, the voltage induced to the auxiliary winding T1-3 of the transformer T1 appears in such a way that the output voltage component of the secondary winding T1-2, obtained according to the turns ratio, and a spike voltage component, generated due to leakage inductance, are simultaneously induced.

The voltage induced to the auxiliary winding T1-3 is fed back to a control circuit 11 through an error amplifier 12 and a feedback condenser Cfb1.

FIG. 2 is a diagram showing an example of the waveform of the voltage induced to the auxiliary winding T1-3.

In FIG. 2, the period from T20 to T21 is the conduction period of the switching element U2 of FIG. 1. During this period, an input voltage V1 is applied to the primary winding T1-1, and a 'negative' voltage proportional to the turns ratio of the primary winding T1-1 to the auxiliary winding T1-3 is applied to the auxiliary winding T1-3. At time point T21, the switching element U2 is turned off, and the winding voltage is reversed at this time and reaches a voltage Vpeak, which is much higher than an output voltage component, because a surge voltage is generated due to the influence of leakage inductance. The peak value Vpeak of the surge voltage is rectified by the diode D3 of FIG. 1, is charged in the condenser C4, and is used as a feedback value required for voltage control.

Therefore, the voltage charged in the condenser C4 contains an output voltage Vo that is output to the secondary winding T1-2 and a surge voltage component attributable to leakage inductance.

The voltage induced to the auxiliary winding T1-3 of FIG. 2 exhibits different waveforms under a heavy load and a light load. FIG. 2(*a*) is a waveform diagram when the load is heavy, that is, under a heavy load, and FIG. 2(*b*) is a waveform diagram when a load is light, that is, under a light load.

Under the heavy load, as shown in FIG. 2(*a*), since the amount of energy stored in the primary winding T1-1 of the transformer T1 during the conduction period of the switching element U2, is large, high surge voltage attributable leakage inductance is generated. Under the light load, as shown in FIG. 2(*b*), since the amount of energy stored in the primary winding T1-1 of the transformer T1 is small, low surge voltage attributable to leakage inductance is generated.

That is, the surge voltage attributable to leakage inductance is changed according to the lightness or heaviness of the load. When control is performed such that the voltage charged in the condenser C4 is maintained at a constant voltage, output voltage inevitably varies. Consequently, under the light load, output voltage increases, and, under the heavy load, output voltage decreases.

When the output voltage is controlled using a typical primary regulation method, the output voltage under no load is increased by an amount ranging from 30 up to 100% of the output voltage under the maximum load. That is, when the output voltage at the maximum load is 5V, the output voltage is increased from 6.5 to 10V under no load.

In summary, the prior art secondary regulation method has high stability, but is problematic in that it is expensive, and the primary regulation method is inexpensive, but is problematic in that the range of variation between voltage at the maximum load and voltage at no load is wide, thus deteriorating the stability of output voltage.

BRIEF SUMMARY OF THE INVENTION

Accordingly, the present invention has been made keeping in mind the above problems occurring in the prior art, and an object of the present invention is to provide a circuit for detecting the error information of an output voltage from the winding voltage of an SMPS, and an error feedback circuit using the error detection circuit, which are implemented to improve a primary regulation method, thus realizing the stability of output voltage approximate to that of a secondary regulation method while enabling inexpensive circuits to be configured.

In order to accomplish the above object, the present invention provides a flyback converter, including a magnetic energy transfer element for storing magnetic energy using an excitation current, and transferring the magnetic energy through a primary winding and a secondary winding, which are closely coupled to each other, a switching element connected to one end of the primary winding of the magnetic energy transfer element and configured to control current of the primary winding of the magnetic energy transfer element, a control unit for controlling the switching element through feedback, and a feedback winding of the magnetic energy transfer element, the flyback converter controlling an output voltage of a Switching Mode Power Supply (SMPS) through primary feedback, comprising an error feedback circuit for detecting a period, during which a voltage of the feedback winding is higher than a reference voltage, and a period, during which the voltage of the feedback winding is lower than the reference voltage, in a flyback period of the magnetic energy transfer element, determining a difference between a ratio of the period, during which the voltage of the feedback winding voltage is higher than the reference voltage, to the flyback period and a preset value, detecting an error of the output voltage of the SMPS, and feeding the detected error back to the control unit.

Further, the present invention provides an error feedback circuit for a Switching Mode Power Supply (SMPS), the error feedback circuit detecting an error of an output voltage of the SMPS from a winding voltage of a magnetic energy transfer element, and feeding back the detected error, comprising a flyback period detection circuit for detecting a flyback period from the winding voltage; a comparison unit for comparing the winding voltage with a reference voltage and outputting a result of comparison; a logic unit for outputting error information of an output voltage of the magnetic energy transfer element according to a flyback period detection output of the flyback period detection circuit and an output of the comparison unit; and an up/down control unit for outputting a feedback value corresponding to the error information output from the logic unit.

Further, the present invention provides an error feedback circuit for a Switching Mode Power Supply (SMPS), the error feedback circuit detecting an error of an output voltage of the SMPS from a winding voltage of a magnetic energy transfer element, and feeding back the detected error, comprising a flyback period detection circuit for detecting a flyback period from the winding voltage; a comparison unit for comparing the winding voltage with a reference voltage and outputting a result of comparison; an up/down control unit for outputting a charge current or a discharge current according to the result of comparison; a switch, an on/off operation of which is controlled by the flyback period detection circuit and which is configured to transfer the charge current or the discharge current from the up/down control unit to a subsequent stage; and a feedback condenser charged and discharged with the charge current and the discharge current, respectively, which are output from the up/down control unit, when the switch is in a closed state, wherein the charge voltage of the feedback condenser is fed back.

Further, the present invention provides an error information detection circuit for detecting error information of an output voltage of a Switching Mode Power Supply (SMPS) from a winding voltage of a magnetic energy transfer element, comprising a flyback period detection circuit for detecting a flyback period from the winding voltage of the magnetic energy transfer element; a comparison unit for comparing the winding voltage of the magnetic energy transfer element with a reference voltage and outputting a result of comparison; and a logic unit for outputting the error information of the output voltage of the SMPS according to a flyback period detection output of the flyback period detection circuit and an output of the comparison unit.

Further, the present invention provides an error information detection circuit for a Switching Mode Power Supply (SMPS), the circuit detecting error information of an output voltage of the SMPS from a winding voltage of a magnetic energy transfer element, comprising a flyback period detection circuit for detecting a flyback period from the winding voltage of the magnetic energy transfer element; a comparison unit for comparing the winding voltage of the magnetic energy transfer element with a reference voltage, and outputting a voltage corresponding to a result of comparison; an up/down control unit for outputting a positive current or a negative current according to the result of comparison; and a switch, an on/off operation of which is controlled by the flyback period detection circuit, the switch being configured to output the output current value received from the up/down control unit when the switch is in a closed state.

Further, the present invention provides an output voltage control method for a flyback converter, the method controlling an output voltage of a Switching Mode Power Supply (SMPS) through a primary feedback in the flyback converter, the flyback converter including a magnetic energy transfer element for storing magnetic energy using an excitation current, and transferring the magnetic energy through a primary winding and a secondary winding, which are closely coupled to each other; a switching element connected to one end of the primary winding of the magnetic energy transfer element and configured to control current of the primary winding of the magnetic energy transfer element; a control unit for controlling the switching element through feedback; and a feedback winding of the magnetic energy transfer element, the flyback converter controlling an output voltage of a Switching Mode Power Supply (SMPS) through primary feedback, wherein the method is performed to detect a period, during which a voltage of the feedback winding is higher than a reference voltage, and a period, during which the voltage of the feedback winding is lower than the reference voltage, in a flyback period of the magnetic energy transfer element, to determine a difference between a ratio of the period, during which the voltage of the feedback winding voltage is higher than the reference voltage, to the flyback period and a preset value, to detect an error of the output voltage of the SMPS, and to feed the detected error back to the control unit, thus controlling the output voltage.

Further, the present invention provides an error feedback method for a Switching Mode Power Supply (SMPS), the method detecting an error of an output voltage of the SMPS from a winding voltage of a magnetic energy transfer element and feeding back the detected error, comprising a flyback period detection step of detecting a flyback period from the winding voltage; a comparison step of comparing the winding voltage with a reference voltage, and outputting a result of comparison; a logic step of outputting error information of the output voltage of the SMPS according to a flyback period detection output at the flyback period detection step and the result of comparison at the comparison step; and an up/down control step of outputting a feedback value corresponding to the error information output at the logic step.

Further, the present invention provides an error feedback method for a Switching Mode Power Supply (SMPS), the method detecting an error of an output voltage of the SMPS from a winding voltage of a magnetic energy transfer element and feeding back the detected error, comprising a flyback period detection step of detecting a flyback period from the winding voltage; a comparison step of comparing the winding voltage with a reference voltage, and outputting a result of comparison; an up/down control step of outputting a charge current or a discharge current according to the result of comparison at the comparison step; a switching step of controlling an on/off operation of a switch according to a flyback period detection output and transferring the charge current or discharge current to a subsequent stage; and a feedback condenser charging/discharging step of charging the feedback condenser with the charge current or discharging the feedback condenser with the discharge current when the switch is in a closed state, wherein a charge voltage of the feedback condenser is fed back.

In addition, the present invention provides a buck converter, a flyback converter, and a buck-boost converter, each including the error feedback circuit or the error feedback method for SMPS.

According to the present invention, output voltage can be regulated using only a primary regulation-based output voltage regulation method to an extent similar to that of a secondary regulation-based output voltage regulation method, and thus advantages, such as the simplification of a power circuit, a reduction in costs attributable to a decrease in the number of parts, and a decrease in assembly costs and time, can be obtained.

BRIEF DESCRIPTION OF THE DRAWINGS

FIG. 1 is a diagram showing a prior art output voltage regulation circuit of an SMPS;

FIG. 2 is a signal waveform diagram of the prior art;

FIG. 3 is a diagram showing the basic construction of an SMPS including an error feedback circuit according to the present invention;

FIG. 4 is a diagram of a first embodiment of an error feedback circuit according to the present invention;

FIG. 5 is a diagram of a second embodiment showing an example of the detailed construction of the up/down control unit of an error feedback circuit according to the present invention;

FIG. 6 is a signal waveform diagram showing an error information detection method according to the present invention;

FIGS. 7 to 11 are signal waveform diagrams showing an error feedback process using the error feedback circuit according to the present invention;

FIG. 12 is a diagram of a third embodiment showing another construction of an error feedback circuit according to the present invention, and the detailed construction of the up/down control unit thereof;

FIG. 13 is a diagram of a fourth embodiment in which the location of the up/down control unit in the third embodiment, showing another construction of the error feedback circuit of the present invention, is changed;

FIG. 14 is a modified circuit diagram of a fifth embodiment for improving variation in response speed;

*FIGS. 15 and 16 are modified circuit diagrams of a sixth embodiment for achieving improvement to further decrease the occurrence of errors attributable to variation in load;

FIG. 17 is a modified circuit diagram of a seventh embodiment for achieving improvement to further decrease the occurrence of errors attributable to variation in load;

FIG. 18 is a signal waveform diagram of the seventh embodiment;

FIG. 19 is a circuit diagram of an eighth embodiment including a delay circuit having a fixed delay time;

FIG. 20 is a signal waveform diagram of the eighth embodiment;

FIGS. 21 and 22 are diagrams showing examples of an electronically constructed switch;

FIG. 23 is a diagram showing an example in which the present invention is applied to a buck converter;

FIG. 24 is a diagram showing an example in which the present invention is applied to a flyback converter having no auxiliary winding for feedback; and FIG. 25 is a diagram showing an example in which the present invention is applied to a buck-boost converter having no auxiliary winding for feedback.

DETAILED DESCRIPTION OF THE INVENTION

Hereinafter, a 'circuit for detecting the error information of an output voltage from the winding voltage of a Switching Mode Power Supply (SMPS) and an error feedback circuit' according to embodiments of the present invention will be described in detail with reference to the attached drawings.

FIG. 3 is a diagram showing the basic construction of an SMPS including an error feedback circuit 30 according to the present invention.

As a representative example of a power circuit to which the present invention is applied, the power circuit includes a transformer T3, in which a primary winding T3-1, a secondary winding T3-2, and a feedback winding T3-3 are closely coupled to each other, a switching element U2 connected to the primary winding T3-1, a diode D4 and a condenser C5 for rectifying and smoothing the voltage of the secondary winding T3-2, and a clamp circuit 13 for clamping a surge spike voltage attributable to leakage inductance.

The error feedback circuit 30 of the present invention detects the error information of an output voltage Vo from the voltage induced to the feedback winding T3-3, and provides feedback required to decrease the error of the output voltage Vo.

The error feedback circuit 30 includes an error information detection unit 31 for detecting the error information of the output voltage Vo from the voltage induced to the feedback winding T3-3, and an up/down control unit 32 for determining the amount of error from the output of the error information detection unit 31 and providing feedback corresponding to the determined amount of error.

First Embodiment

FIG. 4 is a diagram of a first embodiment showing the error information detection unit 31 of FIG. 3 in detail.

The error feedback circuit 30 according to the first embodiment includes an error information detection unit 31 for detecting the error information of an output voltage from voltage induced to a feedback winding T3-3, and an up/down control unit 32 for determining the amount of error from the output of the error information detection unit 31 and providing feedback corresponding to the determined amount of error.

The error information detection unit 31 includes a flyback period detection circuit 34 for detecting a flyback period from the voltage induced to the feedback winding T3-3, a comparison unit 35 for comparing the voltage induced to the feedback winding T3-3 with a reference voltage Vref, and a logic unit 36 for outputting the error information of the output voltage through a Vhigh output terminal 36*a* and a Vlow output terminal 36*b* according to the output of the flyback period detection circuit 34 and the output of the comparison unit 35.

FIG. 6 is a waveform diagram of respective units of FIG. 4, and the operation of FIG. 4 is described with reference to the waveform diagram.

In the waveform diagram of FIG. 6, Vfb is the waveform of the voltage of the feedback winding T3-3 of the transformer T3, Vflyback is the waveform of the output of the flyback period detection circuit 34, Vcomp is the waveform of the output of the comparison unit 35, V36*a* is the waveform of the output of the Vhigh output terminal of the logic unit 36, and V36*b* is the waveform of the output of the Vlow output terminal of the logic unit 36.

In the waveform Vfb of FIG. 6, the period from a time point T40 to a time point T41 is the period during which a switching element U2 is in a turned-on state. During this period, a negative voltage is output from the feedback winding T3-3.

The period from the time point T41 to a time point T43 is the period during which energy, stored in the primary winding T3-1 of the transformer T3, is transferred to the secondary winding T3-2. When time reaches the time point T43, the transfer of energy to the secondary winding is completed. During the period from the time point T43 to a time point T44, voltage charged in the stray capacitance of each winding causes ringing due to each winding and the stray capacitance. The voltage continues while decreasing. When the time reaches the time point T44, a new cycle begins, so that the switching element is turned on again. Thereafter, the above waveforms are repeated.

In a Schottky barrier diode, typically used as the diode D4 of the secondary winding T3-2, the forward voltage drop varies according to the amount of forward current flowing through the diode. During the period from T41 to T43, the voltage of the secondary winding T3-2 gradually decreases with a slope corresponding to the decrease in the current of the diode D4. Further, in the case of a fast recovery diode, there is less variation in forward voltage drop relative to the amount of forward current. However, a slope is also present in the voltage of the secondary winding T3-2 due to a voltage drop caused by the DC resistance value of the secondary winding T3-2 and the Equivalent Series Resistance (ESR) value of an output condenser C5.

Therefore, at the waveform Vfb, during the period from T41 to T43, the voltage of the secondary winding T3-2 of the transformer T3 appears in such a way that the forward voltage drop component of the diode D4, the voltage drop component caused by the ESR of the output condenser, and a voltage drop caused by the resistance of the secondary winding T3-2 of the transformer T3 are added to the output voltage Vo. The voltage of the feedback winding T3-3 decreases with a slope, as in the case of the period from T41 to T43.

Owing to the slope of the voltage, the voltage is easily compared with a reference voltage by the comparison unit 35. In a part of the period from the time point T41 to the time point T43, voltage induced to the feedback winding T3-3 is higher than the level of the reference voltage Vref, and in another part thereof, the induced voltage is lower than the level of the reference voltage Vref.

The present invention is intended to detect the error of the output voltage using information about the result of comparison with the reference voltage during the period. During the period from the time point T41 to the time point T43, that is, during a flyback period (Tflyback), the flyback period detection circuit 34 outputs an "H" level. During the period other than the flyback period, a logic "L" level is output. Typically, since the flyback period detection circuit 34 is implemented using a logic circuit and is widely used, a detailed description thereof is omitted.

Further, during the period from T41 to T43, voltage induced to the feedback winding T3-3 is compared to the reference voltage Vref by the comparison unit 35. During the period (Thigh) from T41 to T42, in which the voltage induced to the feedback winding T3-3 is higher than the reference voltage Vref, the output of the comparison unit 35 is "H", and, during the period (Tlow) from T42 to T43, in which the voltage induced to the feedback winding T3-3 is lower than the reference voltage Vref, the output of the comparison unit 35 is "L". The output of the flyback period detection circuit 34 and the output of the comparison unit 35 are divided into and output through the Vhigh output terminal V36*a* and the Vlow output terminal V36*b* by the logic unit 36. In the case where both the output of the flyback period detection circuit 34 and the output of the comparison unit 35 are "H", the output signal of the Vhigh output terminal V36*a* is "H", and is "L" in other cases. In the case where the output of the flyback period detection circuit 34 is "H" and the output of the comparison unit 35 is "L", the output signal of the Vlow output terminal V36*b* is "H", and is "L" in other cases.

The pulse widths of the output signals of the Vhigh output terminal V36*a* and the Vlow output terminal V36*b* of the logic unit 36 are compared to each other and are analyzed by the up/down control unit 32, so that the amount of error of the output voltage is detected. The up/down control unit 32 generates feedback corresponding to the amount of error, and performs control such that the feedback is input to the control circuit 33, subsequent to the up/down control unit 32, and the error of the output voltage Vo is reduced.

The up/down control unit 32 can be implemented using various methods, such as a digital method or an analog method, and is configured to compare the pulse width of a Vhigh signal from the logic unit 36 with the pulse width of a Vlow signal from the logic unit 36 and to recognize the amount of error using the difference between the pulse widths. An example of a method of implementing the up/down control unit 32 is shown in the second embodiment of FIG. 5.

In the waveform diagram of FIG. 6, a spike voltage and a ringing voltage, attributable to leakage inductance, are not shown in the voltage waveform Vfb in the interests of simplification of the drawing, but the voltage Vfb actually induced to the feedback winding T3-3 includes the spike voltage and ringing voltage of FIGS. 7 to 11 due to the influence of leakage inductance. The most important effect of the present invention is the precise detection of the error of the output voltage and the minimization of the influence of the spike and ringing voltages. A detailed description thereof will be made with reference to the second embodiment of FIG. 5 and FIGS. 7 to 11.

Second Embodiment

FIG. 5 is a diagram of a second embodiment showing an example in which the up/down control unit 32 of the present invention for determining the amount of error from error information output from an error information detection unit 31 and applying feedback corresponding to the amount of error to a control circuit 33 as a control input is simply implemented using an analog method.

The error feedback circuit 30 according to the second embodiment includes the error information detection unit 31 for detecting the error information of an output voltage Vo from voltage induced to a feedback winding T3-3, and the up/down control unit 32 for determining the amount of error from the output of the error information detection unit 31, and providing feedback corresponding to the amount of error.

The error information detection unit 31 includes a flyback period detection circuit 34 for detecting a flyback period from the voltage induced to the feedback winding T3-3, a comparison unit 35 for comparing the voltage induced to the feedback winding T3-3 with a reference voltage Vref, and a logic unit 36 for outputting the error information of an output voltage Vo through a Vhigh output terminal 36*a* and a Vlow output terminal 36*b* according to the output of the flyback period detection circuit 34 and the output of the comparison unit 35.

The up/down control unit 32 is operated so that a feedback condenser Cfb2 is charged through a current source I1, according to the Vhigh output terminal 36*a* of the logic unit 36, and is discharged through a current source I2 according to the Vlow output terminal 36*b* of the logic unit 36, thus enabling a difference between the total amount of charge and the total amount of discharge of the feedback condenser Cfb2 during the flyback period to be represented in the form of variation in the voltage of the feedback condenser Cfb2.

FIGS. 7 to 11 are waveform diagrams of respective units of FIG. 5, and the operation of FIG. 5 is described using FIGS. 7 to 11.

In the waveform diagram of FIG. 7, Vfb is the waveform of the feedback winding T3-3 of the transformer T3, ICfb2 is the waveform of the charge/discharge current of the feedback condenser Cfb2, and VCfb2 is the waveform of the voltage of the feedback condenser Cfb2.

The waveform Vfb of FIG. 7 is the waveform of the voltage of the feedback winding T3-3 of the transformer T3, and is compared to the reference voltage Vref by the comparison unit 35. During the period in which Vfb is higher than the reference voltage Vref, a transistor Q1 is turned on and a transistor Q2 is turned off, so that the feedback condenser Cfb2 is charged through the current source I1. During the period in which Vfb is lower than the reference voltage Vref, the transistor Q1 is turned off and the transistor Q2 is turned on, so that the feedback condenser Cfb2 is discharged through the current source I2. Further, during the period other than the flyback period Tflyback, the transistors Q1 and Q2 are turned off, and the feedback condenser Cfb2 maintains its voltage without change.

Meanwhile, unlike the ideal waveform of FIG. 6, the waveform Vfb of FIG. 7 actually contains a spike voltage and a ringing component attributable to leakage inductance. During the period from a time point T51 to a time point T51', in which the spike voltage and the ringing component appear, the period during which the voltage of the feedback winding T3-3 is higher than the reference voltage Vref and the period during which the voltage of the feedback winding T3-3 is lower than the reference voltage Vref alternate. Accordingly, the charging or discharging of the feedback condenser Cfb2 occurs depending on respective periods. When the sum of the periods, during which the voltage of the feedback winding T3-3 is higher than the reference voltage Vref, and the sum of the periods, during which the voltage of the feedback T3-3 is lower than the reference voltage Vref, during the entire period from T51 to T51' are almost the same as each other, the charging and discharging of the feedback condenser Cfb2 can be considered to be almost canceled. Therefore, during the period from the time point T51' to a time point T53, that is, the total flyback period Tflyback except for the period from T51 to T51', during which the spike voltage and the ringing component appear, in, the feedback condenser Cfb2 is charged or discharged depending on whether the voltage induced to the feedback winding T3-3 is high or low.

When the amount of charge and the amount of discharge of the feedback condenser Cfb2, occurring during the flyback period Tflyback, are equal to each other, that is, when the output voltage is equal to a rated voltage, the voltage of the feedback condenser Cfb2 at the time point T51 and the voltage of the feedback condenser Cfb2 at the time point T53 are equal to each other, and the amount of energy to be transferred to a load in the subsequent cycle through the switching of the switching element U2 is equal to that transferred in the previous cycle.

If the charge current and the discharge current flowing per unit time are equal to each other, the amount of charge and the amount of discharge of the feedback condenser Cfb2 occurring during the total flyback period Tflyback will be equal to each other in the waveform Vfb of FIG. 7 when the voltage of the feedback winding T3-3 is higher than the reference voltage Vref during the period from the time point T51' to a time point T52', which is the center point of the period from T51' to T53, and the voltage of the feedback winding T3-3 is lower than the reference voltage Vref during the period from T52' to T53. The reference voltage required at this time is identical to the voltage of the feedback winding T3-3 at the time point T52'.

If a spike voltage and a ringing component do not exist in the voltage of the feedback winding T3-3, the amount of charge and the amount of discharge of the feedback condenser Cfb2, occurring during the total flyback period Tflyback, are equal to each other when the voltage of the feedback winding T3-3 is higher than the reference voltage Vref during the period from the time point T51 to the time point T52, which is the center point of the period from T51 to T53, and the voltage of the feedback winding T3-3 is lower than the reference voltage Vref during the period from T52 to T53. The reference voltage required at this time is identical to the voltage of the feedback winding T3-3 at the time point T52.

Therefore, in the above description, the influence of the spike voltage and the ringing component appears in such a way that the center of error voltage detection is delayed from T52 to T52', and the reference voltage required to obtain the same output voltage is slightly decreased.

In actual cases, when it is assumed that the flyback period Tflyback is 10 μsec and the period from T51 to T51' is 2 μsec, the period from T51 to T52 is 5 μsec and the period from T51' to T52' is 4 μsec due to the influence of the spike voltage and the ringing component occurring during the period from T51 to T51', so that the period from T51' to T52' becomes shorter than the period from T51 to T52 by 1 μsec. This corresponds to 10% of the total of 10 μsec, and, consequently, the reference voltage must be decreased by a voltage corresponding to 10% of the variation in the voltage of the feedback winding T3-3, obtained in 10 μsec. When the forward current of the diode D4 varies within a range from 5% to 250% of the rated current, the forward voltage drop of the diode varies within a range from 0.3V to 0.7V. Since the total forward voltage drop variation is 0.4V, a reference voltage variation of 40 mV, which is 10% of the total forward voltage drop variation, appears, and is an error occurring due to the influence of the spike voltage and the ringing component.

In the case of the prior art, variation in the output voltage, attributable to the spike voltage and the ringing component, ranges from 5V to 6.5V, or 5V to 10V, which corresponds to about 100% of the output voltage, but, in the present invention, the influence of the spike voltage and the ringing component on the output voltage is only several tens of mV, which is greatly improved compared to the prior art.

FIG. 7 is a waveform diagram when the output voltage Vo is equal to the rated voltage, in which the voltage of the feedback condenser Cfb2 at the time point T53 is equal to the voltage at the time point T51, and is fed back to the control unit 33 so that an amount of energy identical to that of the previous cycle can be output in a subsequent cycle, thus enabling the switching element U2 to maintain the conduction time or switching frequency thereof.

FIG. 8 is a waveform diagram when an output voltage Vo is low.

When the output voltage Vo is lower than a rated voltage, the period (Thigh) during which the voltage of the feedback winding T3-3 is higher than the reference voltage Vref is shortened, and the period (Tlow) during which the voltage of the feedback winding T3-3 is lower than the reference voltage Vref is lengthened. The amount of discharge of the feedback condenser Cfb2 during the period (Tlow) in which the voltage of the feedback winding T3-3 is lower than the reference voltage Vref is greater than the amount of charge of the feedback condenser Cfb2 during the period (Thigh) in which the voltage of the feedback winding T3-3 is higher than the reference voltage Vref. The voltage of the feedback condenser Cfb2 at the time point T53 is lower than the voltage at the time point T51, and is fed back to the control circuit 33 so that an amount of energy greater than that of the previous cycle can be output in a subsequent cycle, thus enabling the conduction time or switching frequency of the switching element U2 to be controlled.

If the output voltage Vo is lower than a rated voltage by 0.2V, the voltage of the feedback winding T3-3 is lower than the reference voltage Vref during the total flyback period from T51 to T53, except for the period from T51 to T51', during which a spike voltage and a ringing component appear, so that the feedback condenser Cfb2 is continuously discharged without being charged. The voltage of the feedback condenser Cfb2 at the time point T53 is much lower than the voltage at the time point T51, and is fed back to the control unit 33 so that an amount of energy much greater than that of the previous cycle can be output in a subsequent cycle, thus enabling the conduction time or switching frequency of the switching element U2 to be controlled.

FIG. 9 is a waveform diagram when an output voltage Vo is high.

When the output voltage Vo is higher than a rated voltage, the period (Thigh) during which the voltage of the feedback winding T3-3 is higher than the reference voltage Vref is lengthened, and the period (Tlow) during which the voltage of the feedback winding T3-3 is lower than the reference voltage Vref is shortened. The amount of charge of the feedback condenser Cfb2 during the period (Thigh) in which the voltage of the feedback winding T3-3 is higher than the reference voltage Vref is greater than the amount of discharge of the feedback condenser Cfb2 during the period (Tlow) in which the voltage of the feedback winding T3-3 is lower than the reference voltage Vref. Accordingly, since the voltage of the feedback condenser Cfb2 at the time point T53 is higher than the voltage at the time point T51, it is fed back to the control circuit 33 so that an amount of energy less than that of the previous cycle can be output in a subsequent cycle, thus enabling the conduction time or switching frequency of the switching element U2 to be controlled.

When the output voltage Vo is higher than the rated voltage by 0.2V, the voltage of the feedback winding T3-3 is higher than the reference voltage Vref during the total flyback period from T51 to T53, except for the period from T51 to T51', during which a spike voltage and a ringing component appear, so that the feedback condenser Cfb2 is merely charged without being discharged. The voltage of the feedback condenser Cfb2 at the time point T53 is much higher than the voltage at the time point T51, and is then fed back to the control unit 33 so that an amount of energy much less than that of the previous cycle can be output in a subsequent cycle, thus enabling the conduction time or switching frequency of the switching element U2 to be controlled.

*When the output voltage is slightly higher or lower than the rated voltage, a fine difference is generated between the amount of charge of the feedback condenser Cfb2 and the amount of discharge of the feedback condenser Cfb2 due to the slight difference in the output voltage, and fine differences are accumulated during the repetition of several cycles, thus resulting in variation in the voltage of the feedback condenser Cfb2, and consequently enabling the output voltage to be controlled.

As described above, the error feedback circuit 30 according to the second embodiment of the present invention is configured to feed a feedback amount, corresponding to the amount of error of the output voltage, back to the control circuit 33, thus enabling the conduction time or switching frequency of the switching element U2 to be controlled.

*FIG. 10 is a waveform diagram obtained at a rated voltage under a light load.

The conduction time of the switching element U2 under the light load is very short, and thus a flyback period from a time point T51" to a time point T53" is also short. Further, under the light load, the amount of energy of leakage inductance is reduced, so that a spike voltage is low, and the period during which a ringing component appears is remarkably shortened.

When it is assumed that the flyback period from T51" to T53" under the light load is about ⅕ of the flyback period from T51 to T53 under the heavy load, as shown in FIGS. 7 to 9, a reduction in the voltage of the feedback winding T3-3, appearing during the ½ period of the flyback period from T51 to T53 under the heavy load, is about 0.2V, and a reduction in the voltage of the feedback winding T3-3, appearing during the ½ period of the flyback period from T51" to T53" under the light load, is about 0.04V.

Consequently, when the reference voltages Vref under the light load and under the heavy load are equal to each other, the output voltage under the light load is 0.16V higher than that under the heavy load.

Therefore, in the prior art, variation in output voltage, attributable to a spike voltage and a ringing component, relative to variation in load under the heavy load and under the light load ranges from 5V to 6.5V, or 5V to 10V, and is increased by an amount ranging from 30 to 100% of the output voltage. In contrast, in the present invention, the influence of a spike voltage and a ringing component is only several tens of mV, which has an effect such that a variation of 0.16V, caused by the influence of the voltage drop of a diode or the like, is canceled. Therefore, it can be seen that variation in output voltage caused by load variation under the light load and under the heavy load is obtained in an amount of about 0.12V, which results in a remarkable improvement compared to the prior art.

FIG. 11 is a signal waveform diagram of the error feedback circuit in a continuous mode, and is equal to that of the operation in a discontinuous mode, as described above with reference to FIGS. 7 to 10.

Third Embodiment

FIG. 12 is a diagram of a third embodiment showing another construction of an error feedback circuit 60 according to the present invention and the detailed construction of the up/down control unit thereof.

The error feedback circuit 60 according to the third embodiment includes an error information detection unit 31' for detecting the error information of an output voltage from a voltage induced to a feedback winding T3-3, and an up/down control unit 61 for determining the amount of error from the output of the error information detection unit 31' and providing feedback corresponding to the amount of error.

The error information detection unit 31' includes a flyback period detection circuit 34 for detecting a flyback period from the voltage induced to the feedback winding T3-3, a comparison unit 35 for comparing the voltage induced to the feedback winding T3-3 with a reference voltage Vref, and a switch 36', the on/off operation of which is controlled by the flyback period detection circuit 34 and which is configured to transmit the output of the comparison unit 35 to the up/down control unit 61 during the on-period thereof.

The up/down control unit 61 is operated so that a feedback condenser Cfb2 is charged through a current source I1, is discharged through a current source I2, or is maintained in an open state according to the input from the switch 36', thus causing the difference between the amount of charge of the feedback condenser Cfb2 and the amount of discharge of the feedback condenser Cfb2 to appear as variation in the voltage of the feedback condenser Cfb2.

The error feedback circuit 60 according to the third embodiment has a circuit structure that uses a single-output switch having three states, namely "H", "open" and "L". During the flyback period, as the output of the flyback period detection circuit 34 becomes "H", the switch 36' is closed, and thus the output of the comparison unit 35 is applied to the up/down control unit 61 as an input. The feedback capacitor Cfb2 is charged through the current source I1 or is discharged through the current source I2 according to the output level of the comparison unit 35. During the period, except for the flyback period, as the output of the feedback period detection circuit 34 becomes "L", the switch 36' is opened, and thus the feedback capacitor Cfb2 stops charging and discharging, and maintains its voltage without change until the subsequent flyback period is reached.

In this case, when the switch 36' is opened, voltage at a point "q" is set to Vcc/2, and a reference voltage VrefH is set to a value higher than Vcc/2 and lower than "H" level, and a reference voltage VrefL is set to a value lower than Vcc/2 and higher than "L" level. When the switch SW1 is closed, the voltage at the point "q" becomes "H" or "L" level according to the output of the comparison unit 35. When the voltage at the point "q" becomes higher than the reference voltage VrefH, a transistor Q1 is turned on and a transistor Q2 is turned off. As a result, the feedback capacitor Cfb2 is charged. When the voltage at the point "q" becomes lower than the reference voltage VrefL, the transistor Q2 is turned on and the transistor Q1 is turned off, and thus the feedback capacitor Cfb2 is discharged.

The switch 36' of FIG. 12 can be regarded as a kind of single-output logic unit, which is different from the logic unit 36 of FIGS. 4 and 5, and can be replaced with the circuit of FIG. 21 or 22 as an example of application.

FIG. 12 is slightly different from FIG. 5 in circuit structure, but the effect of the circuit operation is the same as that of FIG. 5.

Fourth Embodiment

FIG. 13 is a diagram of a fourth embodiment in which the location of the up/down control unit in the third embodiment of the error feedback circuit 60 according to the present invention, is changed.

FIG. 13 illustrates construction in which the location of the up/down control unit 61' of FIG. 12 is moved to a location between a switch 36' and a comparison unit 35, and the input circuit of the up/down control unit 61 is slightly simplified.

*The error feedback circuit 60 of FIG. 13 has a circuit structure that uses a single-output switch 36' having three states, namely "H", "open" and "L". In this case, the amount of charge/discharge current of the up/down control unit 61' is given by the output of the comparison unit 35. During the flyback period, the output of the flyback period detection circuit 34 is "H", and the switch 36' is closed, and thus enables the feedback condenser Cfb2 to be charged through the current source I1 of the up/down control unit 61', or to be discharged through the current source I2. During the period other than the flyback period, the output of the flyback period detection circuit 34 is "L", and the switch 36' is opened, so that the up/down control unit 61' is disconnected, and thus the feedback condenser Cfb2 stops charging or discharging, and maintains the voltage thereof unchanged until the subsequent flyback period is reached.

FIG. 13 is slightly different from FIG. 5 in circuit structure, but the effect of the circuit operation is the same as that of FIG. 5.

Fifth Embodiment

FIG. 14 is a diagram of an error feedback circuit according to a fifth embodiment for improving variation in a response speed.

An error feedback circuit 70 according to a fifth embodiment includes an error information detection unit 31 for detecting the error information of an output voltage from a voltage induced to a feedback winding T3-3, and an up/down control unit 72 for determining the amount of error from the output of the error information detection unit 31, and providing feedback corresponding to the amount of error.

The error information detection unit 31 includes a flyback period detection circuit 34 for detecting a flyback period from the voltage induced to the feedback winding T3-3, a comparison unit 35 for comparing the voltage induced to the feedback winding T3-3 with a reference voltage Vref, and a logic unit 36 for outputting the error information of the output voltage through a Vhigh output terminal 36*a* and a Vlow output terminal 36*b* according to the output of the flyback period detection circuit 34 and the output of the comparison unit 35.

The up/down control unit 72 is configured to charge or discharge a feedback condenser Cfb2 through a variable charge/discharge current source 73, the current value of which is variable according to the voltage of the feedback condenser Cfb2, according to the input from the logic unit 36.

In the error feedback circuit according to the second embodiment of FIG. 5, the third embodiment of FIG. 12, and the fourth embodiment of FIG. 13, the conduction time of a switching element U2 under a heavy load is at least five times as long as that of the switching element U2 under a light load.

The maximum variable voltage of the feedback condenser Cfb2 in one cycle varies according to variation in load. That is, the feedback capacitor Cfb2 can be charged or discharged under the heavy load for a period of time that is five times as long as that under the light load, in one cycle. Further, the voltage of the feedback capacitor Cfb2 has a fast response to the detection of an error under the heavy load because it can be changed with a high amplitude.

However, under the light load, the feedback condenser Cfb2 is charged or discharged only for a period equal to or less than ⅕ of that under the heavy load. Accordingly, variation in the charging/discharging of the feedback condenser Cfb2, caused by error detection in one cycle, decreases, and charge voltage variation speed caused by feedback is slow, and thus a slow response to the detection of an error is exhibited.

FIG. 14 is a circuit diagram showing a variable charge/discharge current-type up/down control unit 72 for adding or subtracting a set charge/discharge current value according to the lightness or heaviness of a load and for maintaining the charge/discharge variation speed of a feedback condenser Cfb2, attributable to feedback, at a uniform speed.

The voltage/current converter (V/I converter) 71 of the variable charge/discharge current-type up/down control unit 72 converts the voltage of the feedback condenser Cfb2 into a current corresponding thereto, outputs the current, and performs setting such that, when the voltage of the feedback condenser Cfb2 is low, output current is low, and when the voltage of the feedback condenser Cfb2 is high, output current is high.

Current flowing through a transistor Q5 is mirrored by a transistor Q6, and is used as a variable charge current source. The current flowing through the transistor Q5 is mirrored by a transistor Q14, is mirrored again by a transistor Q15 and a transistor Q16, and is then used as a discharge current source.

That is, the variable charge/discharge current-type up/down control unit 72 is set such that, under a heavy load, the voltage of the feedback condenser Cfb2 is low, and the flyback period is long, but charge/discharge current is low, and such that, under a light load, the voltage of the feedback condenser Cfb2 is high, and the flyback period is short, but the charge/discharge current is high. Accordingly, in one cycle, variations in charge/discharge voltage under the heavy load and under the light load are similar to each other. Consequently, variation in response speed caused by variation in load is compensated for through the use of the variable charge/discharge current-type up/down control unit 72.

The current source I1 and 12 in the circuit of FIG. 12 or 13 can be replaced with the variable charge/discharge current-type up/down control unit 72 of FIG. 14, and the effect of the replacement is equal to that of FIG. 14.

Sixth Embodiment

FIGS. 15 and 16 illustrate a sixth embodiment for conducting improvement to further decrease the occurrence of errors caused by variation in load.

In the second embodiment of FIG. 5, a feedback condenser Cfb2 is charged or discharged through a fixed current source I1 or I2, so that an output voltage has a range of variation of about 0.12V while a load varies from a light load to a heavy load. This range of variation is remarkably improved compared to the prior art, in which variation ranges from 5V to 6.5V, but there is a need to further improve the range of variation in output voltage caused by variation in a load according to the purpose of use.

FIGS. 15 and 16 are diagrams showing error feedback circuits 80 and 80' for regulating the output voltage of an SMPS according to a sixth embodiment of the present invention, and are intended to further improve stability by reducing the range of variation in output voltage Vo caused by variation in a load.

FIG. 15 illustrates a circuit including a variable charge current source 82 for controlling the charge current of a feedback condenser Cfb2 according to the charge voltage of the feedback condenser Cfb2, and FIG. 16 illustrates a circuit including a variable discharge current source 82' for controlling the discharge current of the feedback condenser Cfb2 according to the charge voltage of the feedback condenser Cfb2.

The error feedback circuit according to the sixth embodiment includes an error information detection unit 31 for detecting the error information of an output voltage Vo from a voltage induced to a feedback winding T3-3, and an up/down control unit 81 for determining the amount of error from the output of the error information detection unit 31 and providing feedback corresponding to the amount of error.

The error information detection unit 31 includes a flyback period detection circuit 34 for detecting a flyback period from the voltage induced to the feedback winding T3-3, a comparison unit 35 for comparing the voltage induced to the feedback winding T3-3 with the reference voltage Vref, and a logic unit 36 for outputting the error information of the output voltage Vo through a Vhigh output terminal 36*a* and a Vlow output terminal 36*b* according to the output of the flyback period detection circuit 34 and the output of the comparison unit 35.

The up/down control unit 81 charges the feedback condenser Cfb2 using the variable charge current source 82 according to the Vhigh output terminal 36*a* of the logic unit 36. The variable charge current source 82 is set such that, when the charge voltage of the feedback condenser Cfb2 is low, the current of the variable charge current source 82 is low, and when the charge voltage of the feedback condenser Cfb2 is high, the current of the variable charge current source 82 is high, and such that discharge current is set by a constant current source I4.

In other words, the up/down control unit 81 of the error feedback circuit according to the sixth embodiment includes the variable charge current source 82. The current of the variable charge current source 82 varies according to the charge voltage of the feedback condenser Cfb2, and the discharge current is fixed by the fixed current source I4. That is, when the charge voltage of the feedback condenser Cfb2 is low, the current of the variable charge current source 82 is low, and when the charge voltage of the feedback condenser Cfb2 is high, the current of the variable charge current source 82 is high.

The variable charge current source 82 includes a voltage/current converter 84 configured to convert the charge voltage of the feedback condenser Cfb2 into a current value, and a current mirror (composed of transistors Q5 and Q6), which is connected to the voltage/current converter 84 and is configured to mirror the current value, obtained through conversion of the charge voltage, at a suitable rate and to provide the current value to a transistor Q3 as a current source.

The voltage/current converter 84 outputs a current corresponding to the charge voltage of the feedback condenser Cfb2. When the voltage of the feedback condenser Cfb2 is low, the output current of the voltage/current converter 84 is also low, whereas, when the voltage of the feedback condenser Cfb2 is high, the output current of the voltage/current converter 84 is also high. The output current of the voltage/current converter 84 is mirrored by the current mirror, composed of the transistors Q5 and Q6, and thus functions as a charge source. When the voltage of the feedback condenser Cfb2 is the lowest voltage (that is, at the time of the maximum output under the heavy load), the charge current source has the minimum value. For example, the current of the charge current source at this time is set to a value that is about ¼ of that of the constant discharge current source I4. Furthermore, when the voltage of the feedback condenser Cfb2 is the highest voltage (at the time of the minimum output under the light load), the charge current source has the highest value. For example, the current of the charge current source at this time is set to a value that is almost equal to that of the constant discharge current source I4.

The detailed operation thereof is described below.

Under the light load, operation is performed while the charge voltage of the feedback condenser Cfb2 is kept high, and the mirrored current of the transistor Q6 falls within the same range of values as that of the constant charge current source I4. Under the light load, in which the output voltage is a rated voltage, the charge voltage of the feedback condenser Cfb2 is high, and the control circuit 33 controls the switching element U2 such that the ratio of the charge time to the discharge time of the feedback condenser Cfb2 becomes about 1:1. If it is assumed that the flyback period under the light load is ⅕ of the flyback period at the maximum load, and variation in the forward voltage drop of the diode D5 of the secondary winding T3-2 under the maximum load ranges from 0.3V to 0.7V, variation in the forward voltage drop of the diode D5 of the secondary winding T3-2 under the light load ranges from 0.3V to 0.38V, and the center value thereof is 0.34V. Since this center value is dropped by the diode D5, the ultimate output voltage is 5.16V when the reference voltage of the secondary winding T3-2 is set to 5.5V.

Under the maximum heavy load, it is assumed that operation is performed while the charge voltage of the feedback condenser Cfb2 is kept low and the mirrored current of the transistor Q6 is set to, for example, a value that is about ¼ of the current of the constant discharge current source I4. Under this load condition, the charge voltage of the feedback condenser Cfb2 is low, and the control circuit 33 controls the switching element U2 such that the switching element U2 is stabilized at the location at which the ratio of the charge time to the discharge time of the feedback condenser Cfb2 is about 4:1. In this case, variation in the forward voltage drop of the diode D4 ranges from 0.3V to 0.7V. The location at which the forward voltage drop of the diode D4 becomes 0.38V is a transition point at which the output of the comparison unit 35 changes from "H" to "L". Since this transition point is dropped by the diode D4, and the reference voltage of the secondary winding T3-2 is set to 5.5V, the ultimate output voltage is 5.12V. This is the voltage that is 40 mV lower than the output voltage of 5.16V under the light load, but shows a further improved result, compared to 0.12V, which is the range of variation in output voltage under the light load and under the heavy load of FIG. 5.

Consequently, in FIG. 15, the amount of current of the charge current source of the feedback condenser Cfb2 is caused to change, so that the ratio of charge time to discharge time under the light load is set to, for example, 1:1, and so that, as the load increases, the time ratio gradually changes and reaches about 4:1 at the maximum heavy load. That is, the present invention decreases the difference between the magnitudes of the voltage drops, occurring in the diode D4 at the time of detection of the output voltage, under the light load and under the heavy load, thus reducing the range of variation between the output voltages under the light load and under the heavy load.

FIG. 16 illustrates a circuit that can be used for the same purpose as that of FIG. 15, and shows a circuit including a variable discharge current source 82' for controlling the discharge current of a feedback condenser Cfb2 according to the voltage of the feedback condenser Cfb2. Charge current is set using a constant charge current source I3 and a transistor Q3. The variable discharge current source 82' includes a voltage/current converter 88 configured to convert the charge voltage of the feedback condenser Cfb2 into a current value, and a current mirror (composed of transistors Q5' and Q6'), which is connected to the voltage/current converter 88 and is configured to mirror the current value, obtained through conversion of the charge voltage, at a suitable rate and to provide the current value to a transistor Q4 as a discharge current source.

The voltage/current converter 88 converts the charge voltage of the feedback condenser Cfb2 into a current corresponding thereto, and outputs the current. When the voltage of the feedback condenser Cfb2 is low, the output current of the voltage/current converter 88 is high, and when the voltage of the feedback condenser Cfb2 is high, the output current of the voltage/current converter 88 is low. This output current of the voltage/current converter 88 is mirrored by the current mirror composed of the transistor Q5' and the transistor Q6', and thus functions as a variable discharge current source. When the voltage of the feedback condenser Cfb2 is the lowest voltage (that is, at the time of the maximum output under the heavy load), the current of the discharge current source has the highest value, and can be set to, for example, a value that is about 4 times that of a constant charge current source I3. When the voltage of the feedback condenser Cfb2 is the highest voltage (that is, at the time of the minimum output under the light load), the current of the discharge current source has the lowest value, and can be set to, for example, a value that is almost equal to that of the constant charge current source I3.

Consequently, in FIG. 16, the amount of current of the discharge current source of the feedback condenser Cfb2 is caused to change, so that the ratio of charge time to discharge time under the light load is set to, for example, 1:1, and so that, as the load increases, the time ratio gradually changes and reaches about 4:1 under the maximum heavy load. That is, the present invention decreases the difference between the magnitudes of the voltage drops occurring in the diode D4 at the time of detection of the output voltage, under the light load and under the heavy load, thus reducing the range of variation between the output voltages under the light load and under the heavy load. The effect of the circuit of FIG. 16 is the same as that obtained using the circuit of FIG. 15.

Seventh Embodiment

FIG. 17 is a diagram of a seventh embodiment, showing another application example for conducting improvement to decrease the occurrence of errors caused by variation in load. In this embodiment, after a flyback period detection circuit 34 detects a flyback period, the output of a flyback signal is delayed by a predetermined initial time of the flyback period to prevent the detection of an error, thus enabling the output voltage to be detected when a diode D4 has a low forward voltage drop.

The time by which the output of the flyback signal is delayed by a delay circuit is experimentally set to the time that minimizes an error.

The error feedback circuit 90 of FIG. 17 is configured such that a variable delay circuit 91, for receiving the flyback signal output of the flyback period detection circuit 34 and performing error detection after a predetermined delay time, is additionally arranged between the flyback period detection circuit 34 and the logic unit 36 of the error feedback circuit 30 of FIG. 5.

The variable delay circuit 91, in an example of the configuration thereof, includes a variable delay transistor Q10, turned on/off in response to the output signal of the flyback period detection circuit 34, a variable delay condenser Cd connected in parallel with the variable delay transistor Q10, a variable delay voltage/current converter 92 for outputting a current corresponding to the charge voltage of a feedback condenser Cfb2, a variable delay current mirror (composed of transistors Q8 and Q9) for supplying the output current of the variable delay voltage/current converter 92 to the variable delay condenser Cd as a charge current when the variable delay transistor Q10 is turned off, and a comparator U12 for varying an output level according to the charged/discharged state of the variable delay condenser Cd.

The operation of the variable delay circuit is described below.

The flyback output signal of the flyback period detection circuit 34 is applied to the gate terminal of the variable delay transistor Q10 and is operated to turn on or off the variable delay transistor Q10. When the variable delay transistor Q10 is turned on, the variable delay condenser Cd, connected in parallel with the variable delay transistor Q10, is discharged.

Meanwhile, the variable delay voltage/current converter 92 outputs a high current when the charge voltage of the feedback condenser Cfb2 is high, and outputs a low current when the charge voltage is low. The output current of the voltage/current converter 92 functions as a variable current source through the variable delay current mirror composed of the transistors Q8 and Q9. The variable current source is used as the charge current of the variable delay condenser Cd when the transistor Q10 is turned off. The voltage at a point "a" varies according to the charged state of the variable delay condenser Cd. The comparator U12 compares the voltage at the point "a" with a reference voltage Vref3, and outputs a resulting voltage.

During a period other than the flyback period, the transistor Q10 is in a turned-on state, and thus the variable delay condenser Cd is fully discharged. At this time, the voltage at the point "a" increases up to the level of Vcc. Then, the output level of the comparator U12 is "L", and thus all of the outputs of the logic unit 36 become an "L" level.

During the flyback period, the variable delay transistor Q10 is in a turned-off state, and the variable delay condenser Cd is charged with the current of the transistor Q9. The current of the transistor Q9 is obtained by obtaining a current corresponding to the charge voltage of the feedback condenser Cfb2 from the variable delay voltage/current converter 92 and by mirroring the current through the variable delay current mirror composed of the transistors Q8 and Q9. Therefore, when the voltage of the feedback condenser Cfb2 is low, the current of the transistor Q9 is low, whereas, when the voltage of the feedback condenser Cfb2 is high, the current of the transistor Q9 is high.

As a result, the charge speed of the variable delay condenser Cd is determined according to the charge voltage of the feedback condenser Cfb2. When the charge voltage of the feedback condenser Cfb2 is low, the charge speed of the variable delay condenser Cd decreases. When the charge voltage of the feedback condenser Cfb2 is high, the charge speed of the variable delay condenser Cd increases.

The time, required for the voltage at a point "a" to reach the reference voltage Vref3 after the variable delay condenser Cd begins charging, is also determined according to the charge voltage of the feedback condenser Cfb2. When the charge voltage of the feedback condenser Cfb2 is low, the time required for the voltage at the point "a" to reach the reference voltage Vref3 increases. When the charge voltage of the feedback condenser Cfb2 is high, the time required for the voltage at the point "a" to reach the reference voltage Vref3 decreases.

FIG. 18 is a waveform diagram of respective units of FIG. 17.

In the waveform diagram of FIG. 18, Vfb is the waveform of a voltage induced to the feedback winding T3-3 of a transformer T3, ICfb2 is the waveform of the charge/discharge current of the feedback condenser Cfb2, and VCfb2 is the waveform of the charge voltage of the feedback condenser Cfb2.

The comparator U12 outputs an "H" level to the logic unit 36 after a delay, corresponding to the period from a time point T101 to a time point T101', from the time point at which the detection output of the flyback period detection circuit 34 becomes an "H" level. Consequently, the charging and discharging of the feedback condenser Cfb2 occur during the period from the time point T101' to a time point T103. During this period, since the current of the secondary-side diode D4 is low, the voltage drop of the diode D4 is low.

Under the light load, the total flyback period is short, and the delay time imposed by the variable delay circuit 91 is rather short, so that the error of the output voltage is detected during part or all of the flyback period.

Consequently, the error feedback circuit 90 of FIG. 17 is configured to detect the error of the output voltage during the period in which current flowing through the diode D4 is low either under a heavy load or under a light load, thus reducing variation in the voltage drop of the diode D4 caused by variation in load. The error feedback circuit of FIG. 17 has improved constant voltage characteristics compared to FIG. 5.

Eighth Embodiment

FIG. 19 is a circuit diagram of an eighth embodiment, including a delay circuit 37 having a fixed delay time, and FIG. 20 is a signal waveform diagram of respective units of FIG. 19.

In the case where a switching element U2 is turned off when the drain current thereof reaches a certain level, and an output voltage is regulated by changing a switching frequency or skipping some switching cycles, the pulse width of the flyback detection output of the flyback period detection circuit 34 becomes constant. In this case, the detection of the output voltage is delayed by the period from T121 to T121', during which a spike voltage and a ringing component occur, through the use of the delay circuit 37 having a fixed delay time. During the period in which the voltage drop of the diode D4 is low, the output voltage is detected, so that a regulated output voltage can be detected without being influenced by the spike voltage or by the ringing component.

FIG. 21 is a diagram showing an example in which the switch SW1 of FIGS. 12 and 13 is electronically constructed. When an input (c) received from the flyback period detection circuit 34 or the variable delay circuit 91 is "H", the transistor QS1 and the transistor QS2 are simultaneously turned on, so that an input terminal (in) is electrically connected to an output terminal (out). When the input (c) is "L", the transistor QS1 and the transistor QS are simultaneously turned off, so that the input terminal (in) is electrically disconnected from the output terminal (out).

FIG. 22 is a diagram showing an example of a circuit structure capable of replacing the switch SW1 of FIG. 12.

FIG. 22 illustrates an example in which a single-output circuit, having three states, namely "H", "open", and "L", and including a current source I11, a transistor Q11, a transistor Q12, and a current source I12, is connected to the output of the logic unit 36 of FIG. 5.

As shown in FIGS. 21 and 22, the switch SW1 of FIGS. 12 and 13 can be replaced with other types of circuits, which are thus used.

In the circuit diagrams of FIGS. 1 to 19, the operation of circuits in a stage previous to the control unit 33 has been described using a control circuit, which performs setting such that, when an input voltage is low, the amount of output energy is large, and when an input voltage is high, the amount of output energy is small, as an example of the control circuit 33. However, in the case of a control circuit, which performs setting such that, when an input voltage is high, the amount of output energy is large, and when an input voltage is low, the amount of output energy is small, the circuits in a stage previous to the control circuit can be modified and thus used.

*In most cases, since the reference voltage Vref is actually set to a value lower than the voltage of the feedback winding T3-3, the comparison unit 35 of the circuit diagrams of FIGS. 1 to 19 actually includes a circuit for dropping the voltage of the feedback winding T3-3 to a suitable level, and has general requirements, such as a high input resistance for protection against an electrostatic surge voltage or the like. Further, the comparison unit 35 in the circuit diagrams of FIGS. 1 to 19 includes not only a function of a comparator for comparing an input voltage value with a reference level, but also a function of a comparator for comparing a current value, input from an input circuit which receives a current as an input, with a reference level.

The fifth embodiment, the sixth embodiment and the seventh embodiment of the present invention can also be implemented in the circuit using the switch 36' of the fourth embodiment, as a circuit having the same purpose, and the effect thereof is equal to that of the fifth, sixth, and seventh embodiments.

Further, the fifth, sixth, and seventh embodiments can be used in the form of one or more combinations thereof.

FIG. 23 is a diagram showing an example in which the error feedback circuit of the present invention is applied to a buck converter, FIG. 24 is a diagram showing an example in which the error feedback circuit of the present invention is applied to a flyback converter having no auxiliary winding for feedback, and FIG. 25 is a diagram showing an example in which the error feedback circuit of the present invention is applied to a buck-boost converter having no auxiliary winding for feedback.

Although the technical spirit of the present invention has been disclosed with reference to the attached drawings, the description is intended merely to describe the preferred embodiments of the present invention for illustrative purposes, and is not intended to limit the present invention. Those skilled in the art will appreciate that various modifications and variations are possible, without departing from the scope and spirit of the invention.

The present invention can be applied to a power circuit for an SMPS.

The invention claimed is:

1. A flyback converter including a magnetic energy transfer element for storing magnetic energy using an excitation current and transferring the magnetic energy through a primary winding and a secondary winding, which are closely coupled to each other, a switching element connected to one end of the primary winding of the magnetic energy transfer element and configured to control current of the primary winding of the magnetic energy transfer element, a control unit for controlling the switching element through feedback, and a feedback winding of the magnetic energy transfer element, the flyback converter controlling an output voltage of a Switching Mode Power Supply (SMPS) through feedback, comprising:

an error feedback circuit for detecting a period, during which a voltage of the feedback winding is higher than a reference voltage, and a period, during which the voltage of the feedback winding is lower than the reference voltage, in a flyback period of the magnetic energy transfer element, determining a difference between a ratio of the period, during which the voltage of the feedback winding is higher than the reference voltage, to the flyback period and a preset value, detecting an error of the output voltage of the SMPS, and feeding the detected error back to the control unit.

2. The flyback converter according to claim 1, wherein the preset value varies according to a magnitude of an output current of the SMPS.

3. The flyback converter according to claim 1, wherein the error feedback circuit sets a preset initial delay time of the flyback period as a non-flyback period, and sets the flyback period, except for the non-flyback period, as a new flyback period, thus detecting the error of the output voltage of the SMPS.

4. An error feedback circuit for a Switching Mode Power Supply (SMPS), the error feedback circuit detecting an error of an output voltage of the SMPS from a winding voltage of a magnetic energy transfer element, and feeding back the detected error, comprising:

a flyback period detection circuit for detecting a flyback period from the winding voltage;

a comparison unit for comparing the winding voltage with a reference voltage and outputting a result of comparison;

a logic unit for outputting error information of an output voltage of the magnetic energy transfer element according to a flyback period detection output of the flyback period detection circuit and an output of the comparison unit; and an up/down control unit for outputting a feedback value corresponding to the error information output from the logic unit, whereby the error feedback circuit detects a period during which the winding voltage is higher than a reference voltage, and a period during which the winding voltage is lower than the reference voltage, in a flyback period of the magnetic energy transfer element, determines a difference between a ratio of the period, during which the winding voltage is higher than the reference voltage, to the flyback period and a preset value, detects an error of the output voltage of the SMPS, and feeds back the detected error.

5. The error feedback circuit according to claim 4, further comprising a delay circuit for delaying the flyback period detection output of the flyback period detection circuit and setting a preset initial period of the flyback period as a non-flyback period.

6. The error feedback circuit according to claim 4, wherein the logic unit is implemented using a switch, an on/off operation of which is controlled by the flyback period detection circuit, and which is configured to connect the comparison unit with the up/down control unit.

7. The error feedback circuit according to claim 6, further comprising a delay circuit for delaying the flyback period detection output of the flyback period detection circuit and setting a preset initial period of the flyback period as a non-flyback period.

8. The error feedback circuit according to claim 4, wherein:

the comparison unit compares the winding voltage with the reference voltage, and outputs information about a Thigh period, during which the winding voltage is higher than the reference voltage, and a Tlow period, during which the winding voltage is lower than the reference voltage, the up/down control unit comprises a feedback condenser charged with a preset charge current and discharged with a preset discharge current during the Thigh period and the Tlow period, respectively, and a charge voltage of the feedback condenser is the feedback value.

9. The error feedback circuit according to claim 8, wherein the up/down control unit further comprises a variable charge current source for varying the charge current according to the charge voltage of the feedback condenser.

10. The error feedback circuit according to claim 8, wherein the up/down control unit further comprises a variable discharge current source for varying the discharge current according to the charge voltage of the feedback condenser.

11. The error feedback circuit according to claim 8, wherein the up/down control unit further comprises a variable charge/discharge current source for varying the charge current and the discharge current according to the charge voltage of the feedback condenser.

12. The error feedback circuit according to claim 8, further comprising a delay circuit for delaying the flyback period detection output of the flyback period detection circuit and setting a preset initial period of the flyback period as a non-flyback period.

13. The error feedback circuit according to claim 8, further comprising a variable delay circuit for setting a predetermined period of the flyback period detected by the flyback period detection circuit as a non-flyback period, the predetermined period corresponding to a time preset according to the charge voltage of the feedback condenser.

14. The error feedback circuit according to claim 8, wherein the logic unit is implemented using a switch, an on/off operation of which is controlled by the flyback period detection circuit, and which is configured to connect the comparison unit with the up/down control unit.

15. The error feedback circuit according to claim 14, wherein the up/down control unit further comprises a variable charge current source for varying the charge current according to the charge voltage of the feedback condenser.

16. The error feedback circuit according to claim 14, wherein the up/down control unit further comprises a variable discharge current source for varying the discharge current according to the charge voltage of the feedback condenser.

17. The error feedback circuit according to claim 14, wherein the up/down control unit further comprises a variable charge/discharge current source for varying the charge current and the discharge current according to the charge voltage of the feedback condenser.

18. The error feedback circuit according to claim 14, further comprising a delay circuit for delaying the flyback period detection output of the flyback period detection circuit and setting a preset initial period of the flyback period as a non-flyback period.

19. The error feedback circuit according to claim 14, further comprising a variable delay circuit for maintaining the switch in an open state for a predetermined period of the flyback period detected by the flyback period detection circuit, the predetermined period corresponding to a time preset according to the charge voltage of the feedback condenser.

20. An error feedback circuit for a Switching Mode Power Supply (SMPS), the error feedback circuit detecting an error of an output voltage of the SMPS from a winding voltage of a magnetic energy transfer element, and feeding back the detected error, comprising:

a flyback period detection circuit for detecting a flyback period from the winding voltage;

a comparison unit for comparing the winding voltage with a reference voltage and outputting a result of comparison;

an up/down control unit for outputting a charge current or a discharge current according to the result of comparison;

a switch, an on/off operation of which is controlled by the flyback period detection circuit and which is configured to transfer the charge current or the discharge current from the up/down control unit to a subsequent stage; and a feedback condenser charged and discharged with the charge current and the discharge current, respectively, which are output from the up/down control unit, when the switch is in a closed state, wherein the charge voltage of the feedback condenser is fed back, whereby the error feedback circuit detects a period during which the winding voltage is higher than a reference voltage, and a period during which the winding voltage is lower than the reference voltage, in a flyback period of the magnetic energy transfer element, determines a difference between a ratio of the period, during which the winding voltage is higher than the reference voltage, to the flyback period and a preset value, detects an error of the output voltage of the SMPS, and feeds back the detected error.

21. The error feedback circuit according to claim 20, wherein the up/down control unit further comprises a variable charge current source for varying the charge current according to the charge voltage of the feedback condenser.

22. The error feedback circuit according to claim 20, wherein the up/down control unit further comprises a variable discharge current source for varying the discharge current according to the charge voltage of the feedback condenser.

23. The error feedback circuit according to claim 20, wherein the up/down control unit further comprises a variable charge/discharge current source for varying the charge current and the discharge current according to the charge voltage of the feedback condenser.

24. The error feedback circuit according to claim 20, further comprising a delay circuit for delaying the flyback period detection output of the flyback period detection circuit and setting a preset initial period of the flyback period as a non-flyback period.

25. The error feedback circuit according to claim 20, further comprising a variable delay circuit for maintaining the switch in an open state for a predetermined period of the flyback period detected by the flyback period detection circuit, the predetermined period corresponding to a time preset according to the charge voltage of the feedback condenser.

26. An error information detection circuit for a Switching Mode Power Supply (SMPS), the circuit detecting error information of an output voltage of the SMPS from a winding voltage of a magnetic energy transfer element, wherein:

the error information detection circuit detects a period, during which the winding voltage of the magnetic energy transfer element is higher than a reference voltage, and a period, during which the winding voltage of the magnetic energy transfer element is lower than the reference voltage, in a flyback period of the magnetic energy transfer element, and outputs error information corresponding to the detected periods during which the winding voltage is higher than the reference voltage and during which the winding voltage is lower than the reference voltage.

27. The error information detection circuit according to claim 26, comprising:

a flyback period detection circuit for detecting a flyback period from the winding voltage of the magnetic energy transfer element;

a comparison unit for comparing the winding voltage of the magnetic energy transfer element with the reference voltage and outputting a result of comparison; and a logic unit for outputting error information of an output voltage of the magnetic energy transfer element according to a flyback period detection output of the flyback period detection circuit and an output of the comparison unit.

28. The error information detection circuit according to claim 27, wherein the logic unit comprises a switch, an on/off operation of which is controlled by the flyback period detection circuit and which is configured to transfer the output of the comparison unit to a subsequent stage when the switch is in a closed state.

29. The error information detection circuit according to claim 27, further comprising a delay circuit for delaying the flyback period detection output of the flyback period detection circuit and setting a preset initial period of the flyback period as a non-flyback period.

30. The error information detection circuit according to claim 26, comprising:

a flyback period detection circuit for detecting a flyback period from the winding voltage of the magnetic energy transfer element;

a comparison unit for comparing the winding voltage of the magnetic energy transfer element with a reference voltage, and outputting a voltage corresponding to a result of comparison;

an up/down control unit for outputting a positive current or a negative current according to the result of comparison; and a switch, an on/off operation of which is controlled by the flyback period detection circuit, the switch being configured to output the output current value received from the up/down control unit when the switch is in a closed state.

31. An output voltage control method for a Switching Mode Power Supply (SMPS), the SMPS including a magnetic energy transfer element for storing magnetic energy using an excitation current, and transferring the magnetic energy; a switching element connected to one end of the winding of the magnetic energy transfer element and configured to control current of the winding of the magnetic energy transfer element; a control unit for controlling the switching element through feedback; and a feedback winding of the magnetic energy transfer element, wherein said method comprises:

detecting a period, during which a voltage of the feedback winding is higher than a reference voltage, and a period, during which the voltage of the feedback winding is lower than the reference voltage, in a flyback period of the magnetic energy transfer element;

determining a difference between a ratio of the period, during which the voltage of the feedback winding is higher than the reference voltage, to the flyback period and a preset value, detecting an error of the output voltage of the SMPS; and feeding the detected error back to the control unit, thus controlling the output voltage.

32. The output voltage control method according to claim 31, wherein the preset value varies according to a magnitude of an output current of the SMPS.

33. The output voltage control method according to claim 31, wherein the error of the output voltage of the SMPS is detected by setting a preset initial delay time of the flyback period as a non-flyback period, and setting the flyback period, except for the non-flyback period, as a new flyback period.

* * * * *